(12) United States Patent
Shen

(10) Patent No.: US 6,611,850 B1
(45) Date of Patent: Aug. 26, 2003

(54) METHOD AND CONTROL APPARATUS FOR FILE BACKUP AND RESTORATION

(75) Inventor: Timothy Shen, Taipei (TW)

(73) Assignee: Reliatech Ltd., Tortola (VG)

( * ) Notice: Subject to any disclaimer, the term of this patent is extended or adjusted under 35 U.S.C. 154(b) by 0 days.

(21) Appl. No.: 09/486,422

(22) PCT Filed: Aug. 18, 1998

(86) PCT No.: PCT/JP98/03650

§ 371 (c)(1),
(2), (4) Date: Feb. 26, 2000

(87) PCT Pub. No.: WO99/10810

PCT Pub. Date: Mar. 4, 1999

(30) Foreign Application Priority Data

Aug. 26, 1997 (JP) .............................................. 9-230051
Dec. 12, 1997 (JP) .............................................. 9-343339

(51) Int. Cl.[7] ............................................... G06F 17/30
(52) U.S. Cl. ....................................... 707/204; 707/202
(58) Field of Search ................................ 707/202, 204

(56) References Cited

U.S. PATENT DOCUMENTS

| 5,008,936 A | * | 4/1991 | Hamilton et al. ............ 380/281 |
| 5,276,867 A | * | 1/1994 | Kenley et al. ............... 707/204 |
| 5,586,333 A | * | 12/1996 | Choi et al. ................... 713/320 |
| 5,694,600 A | * | 12/1997 | Khenson et al. ............. 709/321 |
| 5,713,024 A | * | 1/1998 | Halladay ...................... 714/13 |
| 5,745,669 A | * | 4/1998 | Hugard et al. ................. 714/3 |
| 5,758,359 A | * | 5/1998 | Saxon ......................... 707/204 |
| 6,023,506 A | * | 2/2000 | Ote et al. ...................... 380/45 |
| 6,070,160 A | * | 5/2000 | Geary ......................... 382/149 |

OTHER PUBLICATIONS

Central Point Software Inc., Hand disk Backup, 1991, pp. 15–17, 33, 34, 38, 39, 59, 60, 61, 67. 68. 71. 72 and 107.*
Harvey MDeitel, Operating Systems 1990, Addison–Wesley Publishing Company, Inc. pp. 389–391.*

* cited by examiner

Primary Examiner—Jean R. Homere
Assistant Examiner—Leslie Wong
(74) Attorney, Agent, or Firm—D. E. Schreiber

(57) ABSTRACT

The backup/restore method as described in this invention has a "backup copy generating process" to generate backup copy(ies) and a "restore process" to restore the original file(s) from the backup copy(ies) generated by the "backup copy generating process," and includes a process to instruct the execution of the "restore process" by designating the file (name) and the time period backing from the current time (S801–S803), and when the execution of "restore process" is instructed, a process to control the execution of the "restore process" (S804) by selecting the corresponding backup copy file(s), according to the designated file (name) and designated time period.

27 Claims, 16 Drawing Sheets

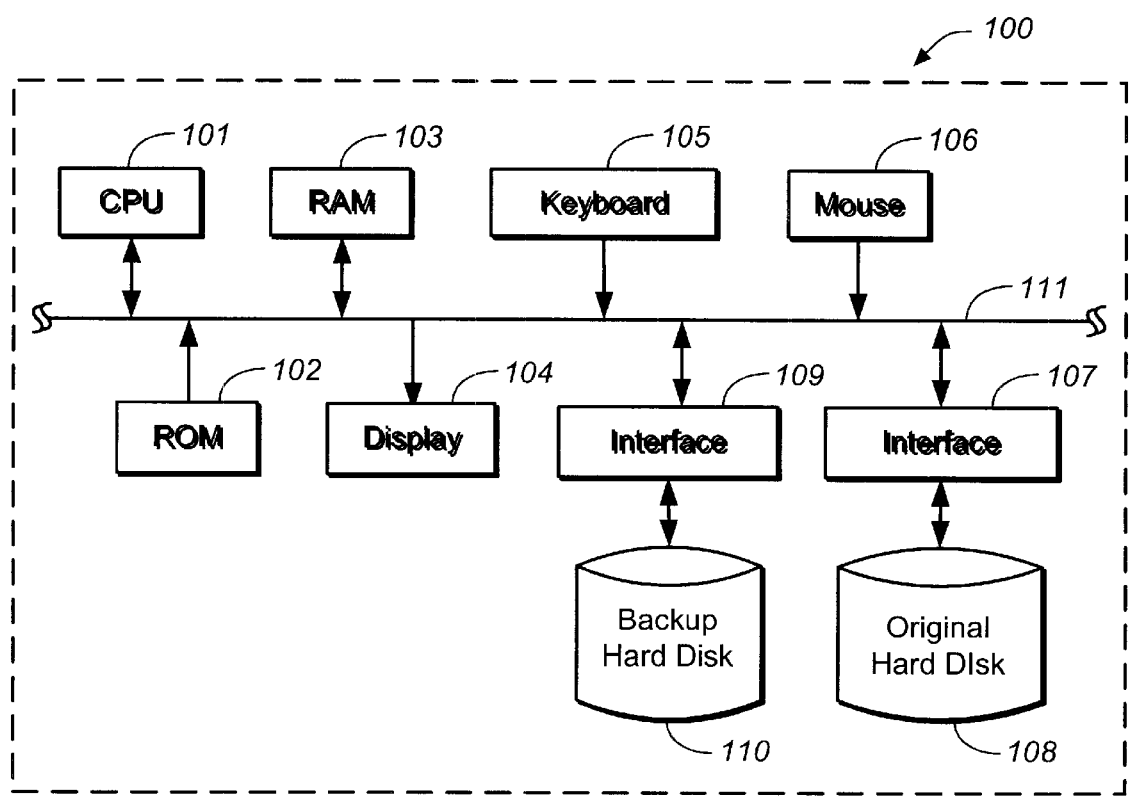
FIG._1

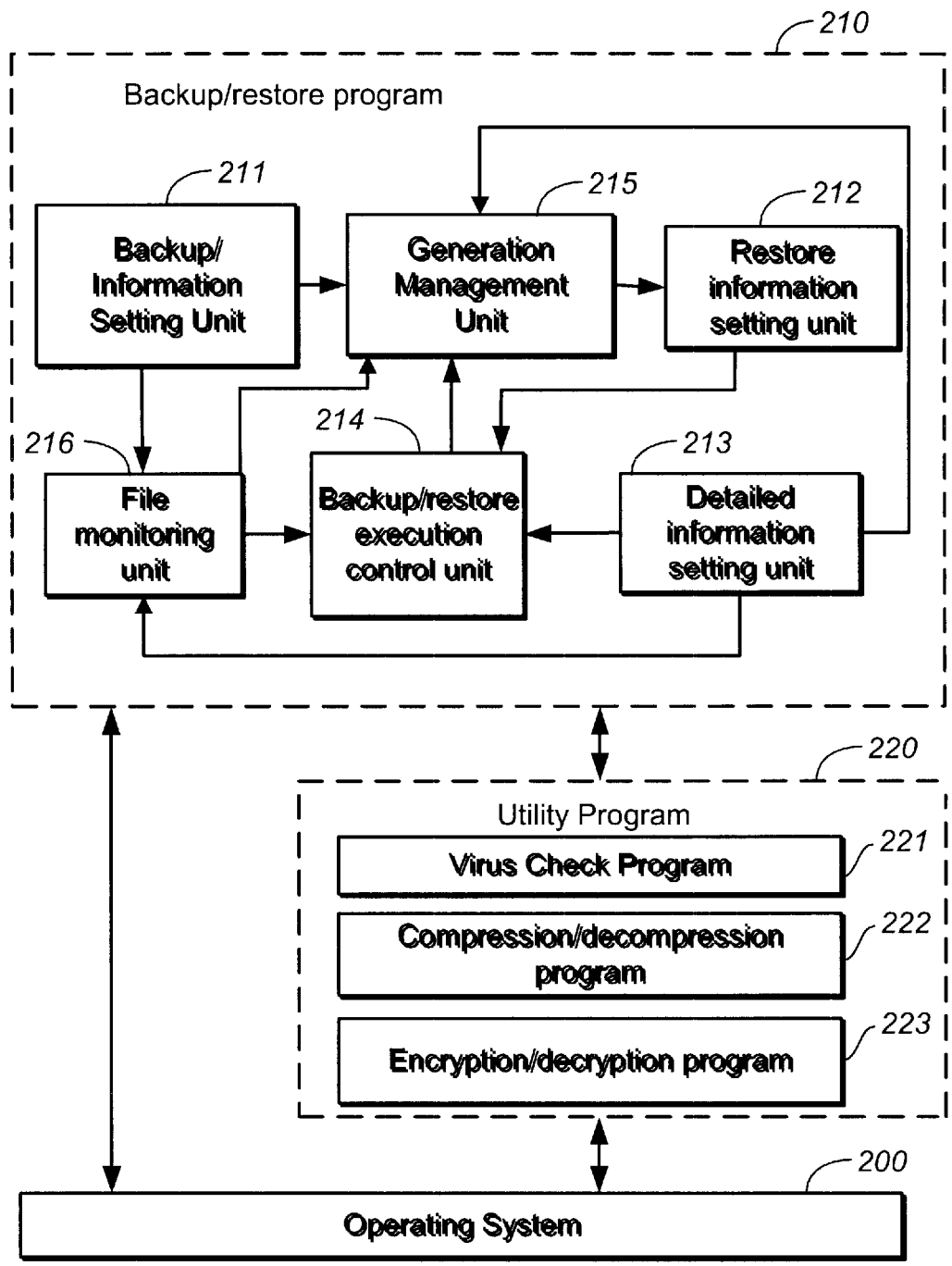
FIG._2

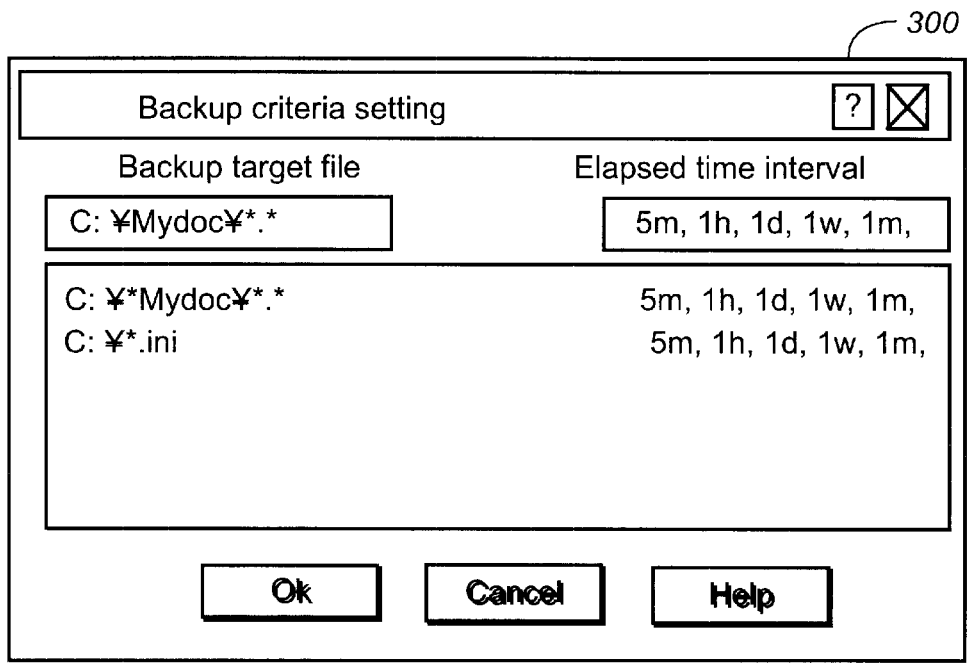
FIG._3
| Full path name | Time stamp | |
|---|---|---|
| C: ¥Mydoc¥Thisfile.doc | 97/10/6 | 18:33 |
| C: ¥Mydoc¥Thatfile.xis | 97/10/7 | 10:40 |
| ⋮ | ⋮ | ⋮ |
| C: ¥Thesefile.ini | 97/11/4 | 9:30 |
| C: ¥Thosefile.ini | 97/11/6 | 15:12 |
FIG._4

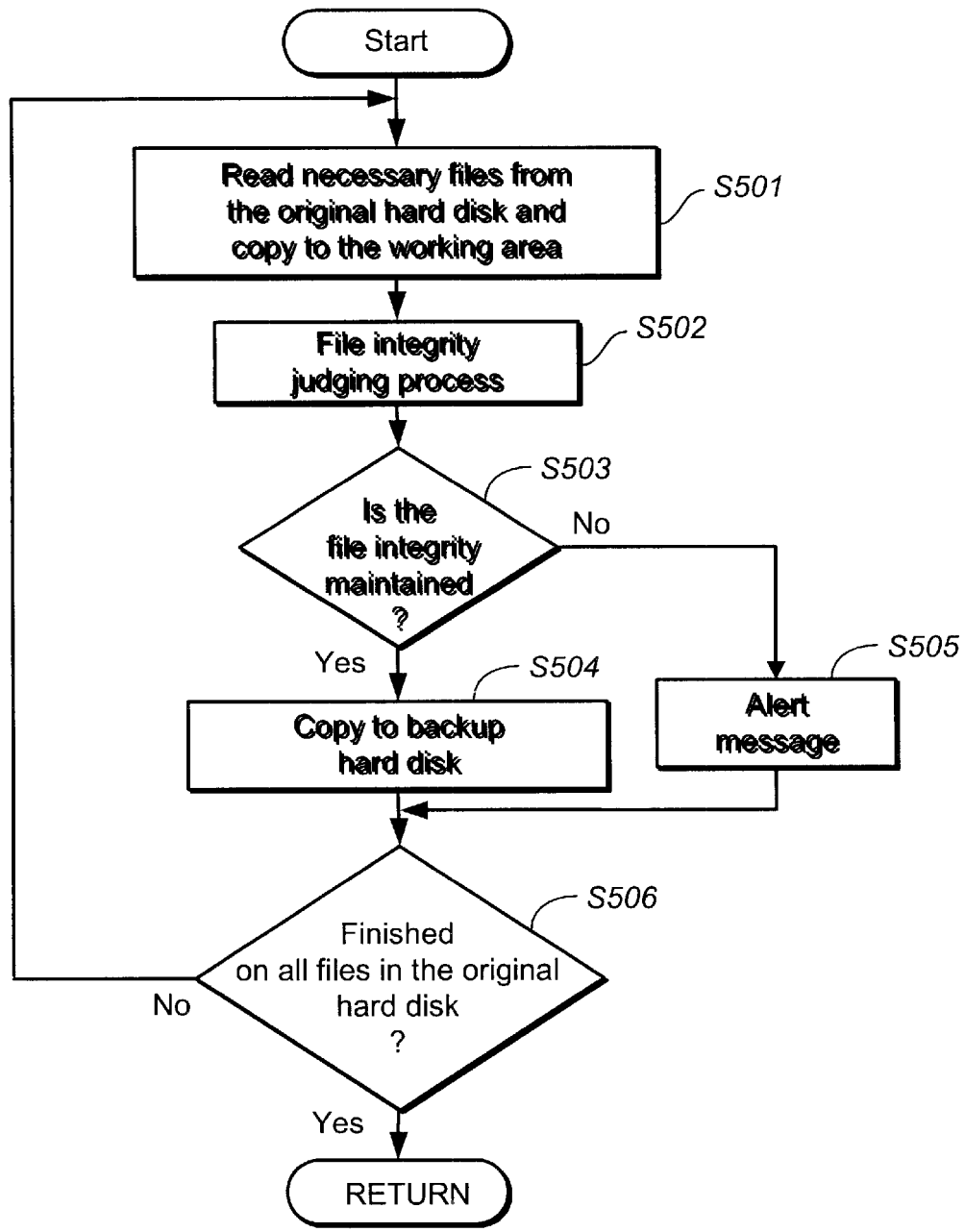
FIG._5

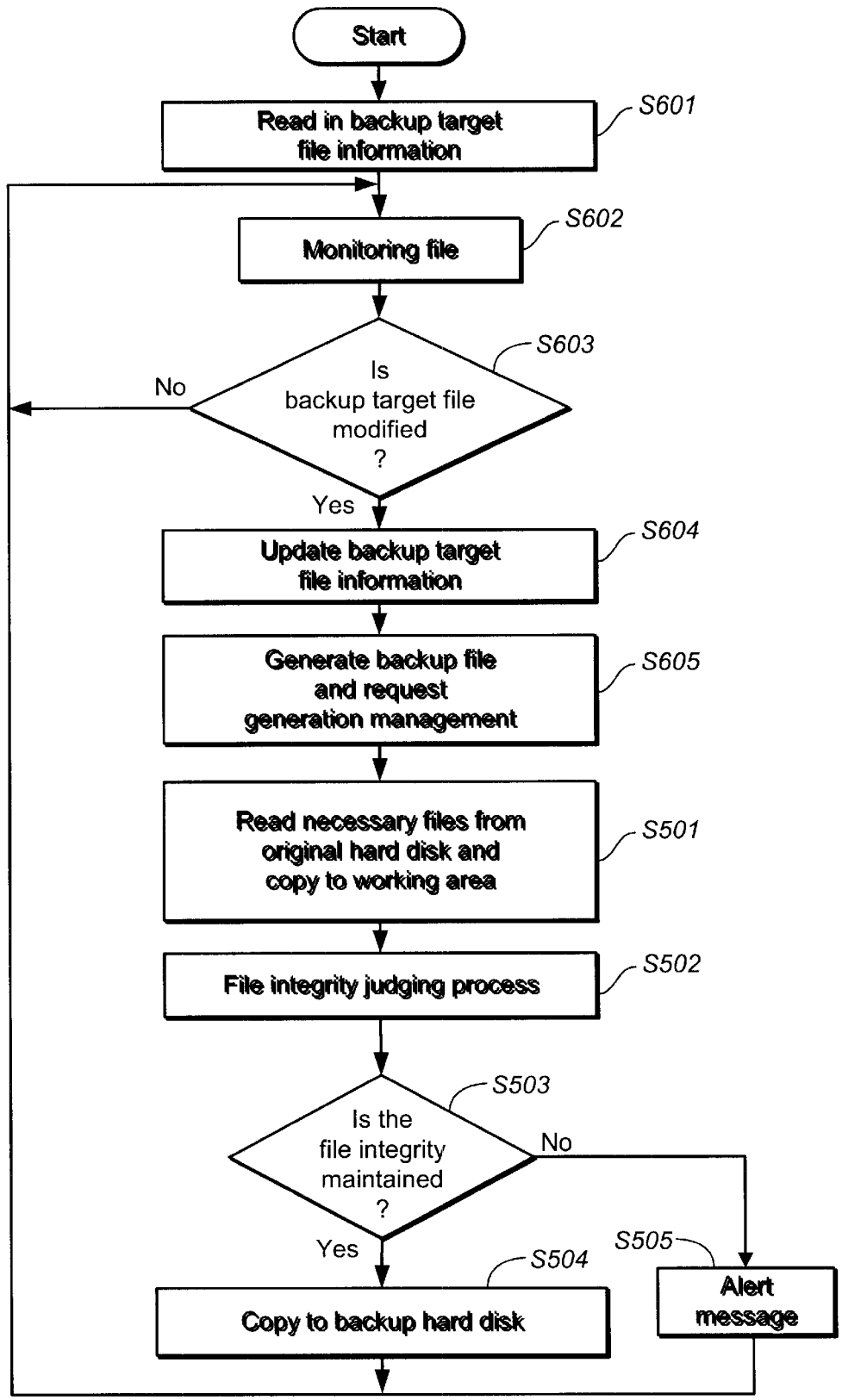
FIG._6

| File name | Current time | 5 minutes | 1 hour | 1 day | 1 week | 1 month |
|---|---|---|---|---|---|---|
| thisfile.doc | 1997.08.02.10.00 | 1997.07.01.15.30 | 1997.07.01.15.30 | 1997.07.1.15.30 | 1997.07.01.15.30 | 1997.07.01.15.30 |
| .. | .. | .. | .. | .. | .. | .. |

*FIG._7A*

| File name | Current time | 5 minutes | 1 hour | 1 day | 1 week | 1 month |
|---|---|---|---|---|---|---|
| thisfile.doc | 1997.08.04.12.00 | 1997.08.03.11.16 | 1997.08.03.11.16 | 1997.08.03.11.16 | 1997.07.01.15.30 | 1997.07.01.15.30 |
| .. | .. | .. | .. | .. | .. | .. |

*FIG._7B*

| File name | Current time | 5 minutes | 1 hour | 1 day | 1 week | 1 month |
|---|---|---|---|---|---|---|
| thisfile.doc | 1997.08.04.14.00 | 1997.08.04.13.40 | 1997.08.03.11.16 | 1997.08.03.11.16 | 1997.07.01.15.30 | 1997.07.01.15.30 |
| .. | .. | .. | .. | .. | .. | .. |

*FIG._7C*

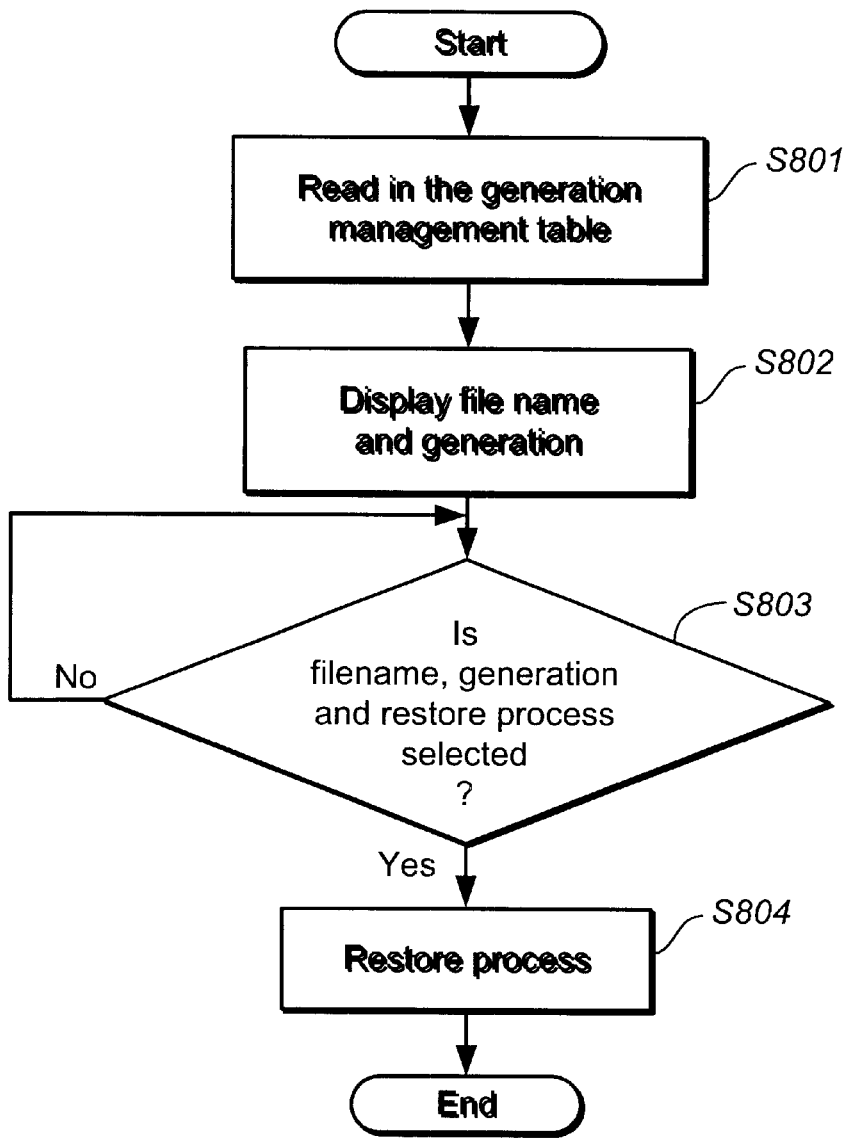
FIG._8

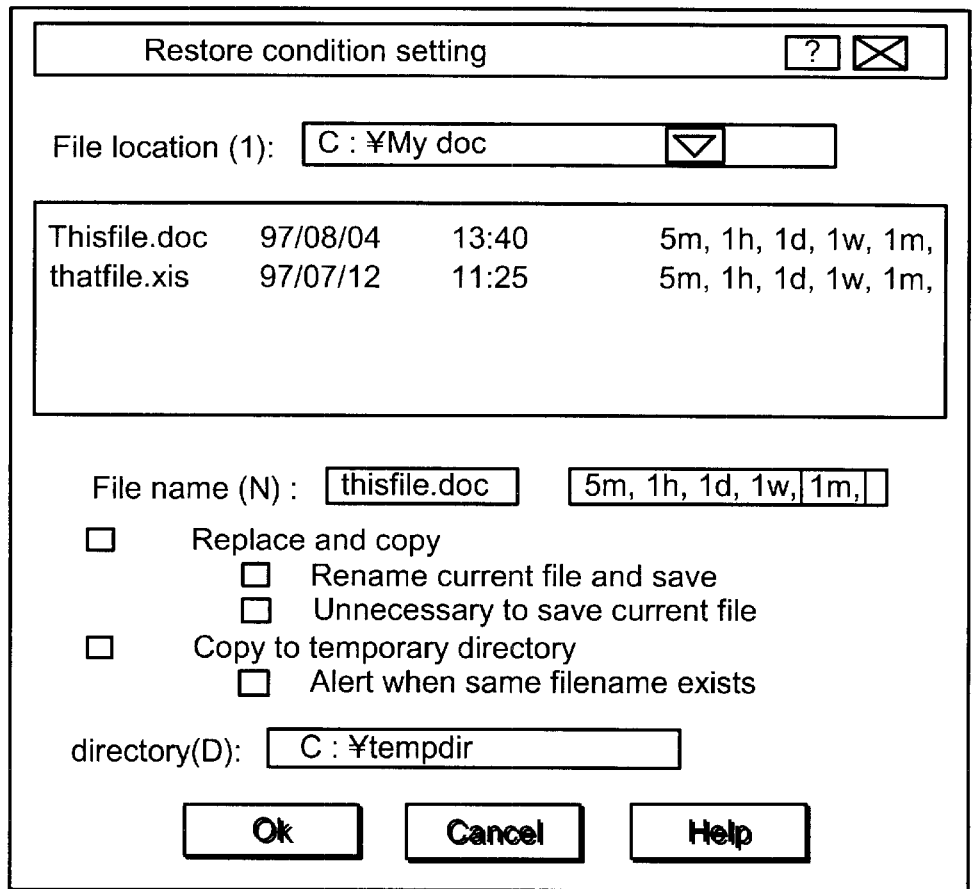
FIG._9

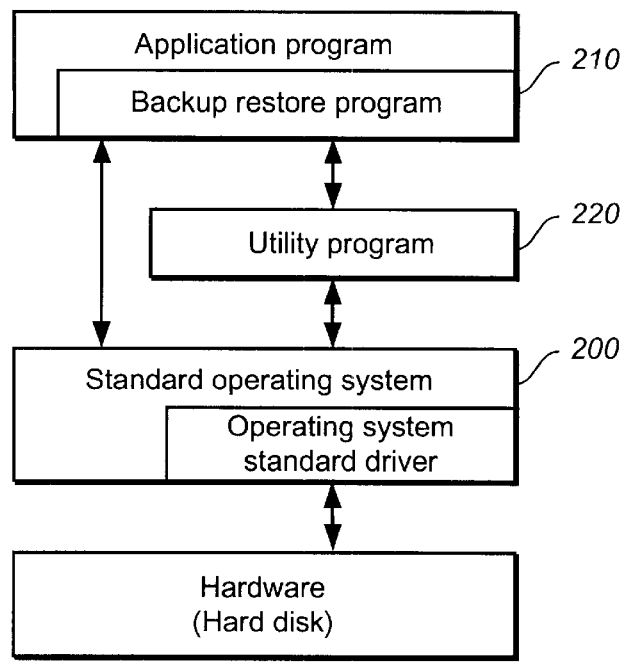
FIG._10
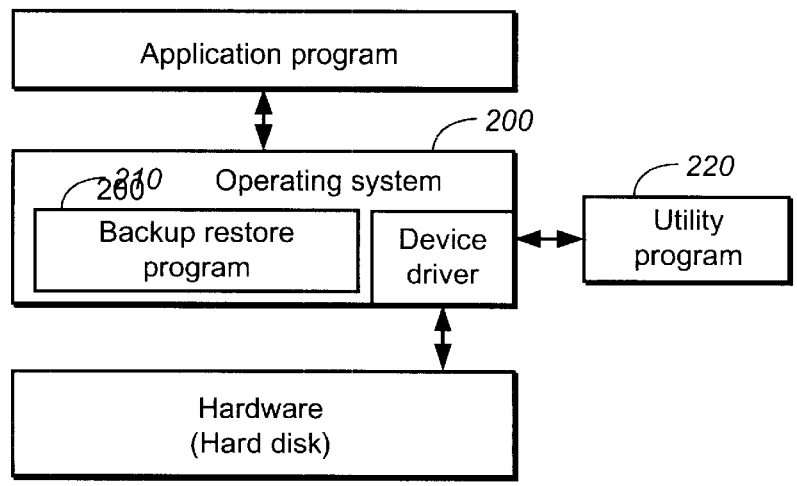
FIG._11

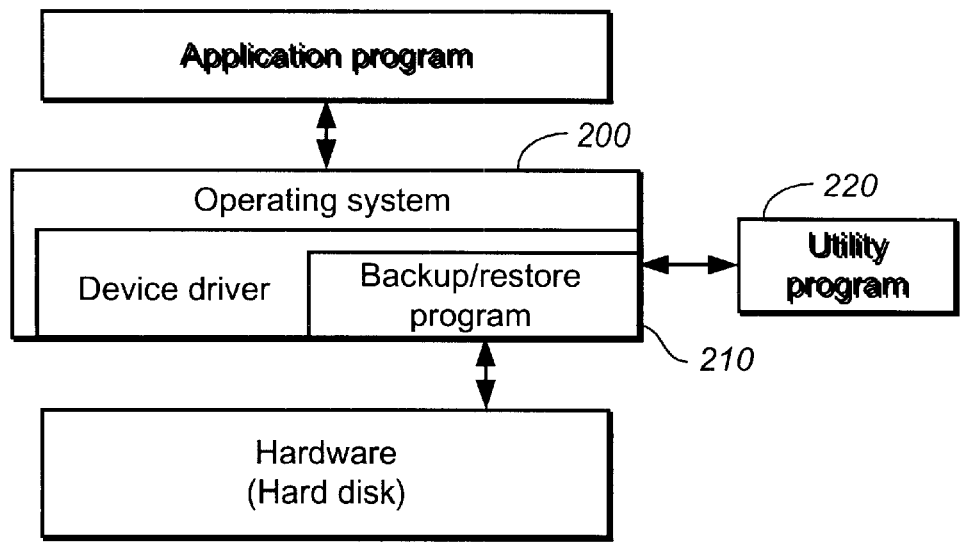
FIG._12
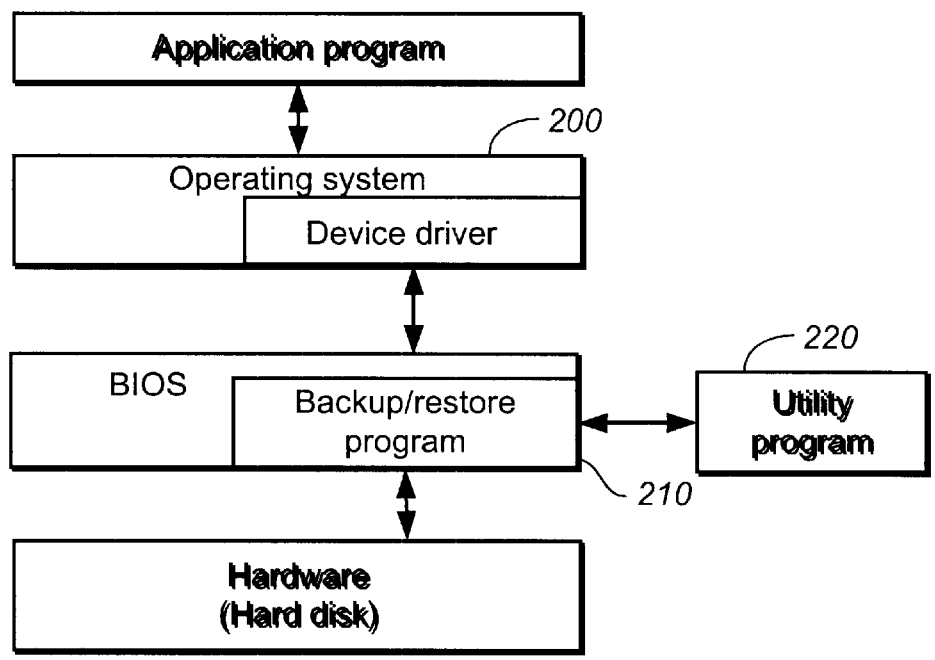
FIG._13

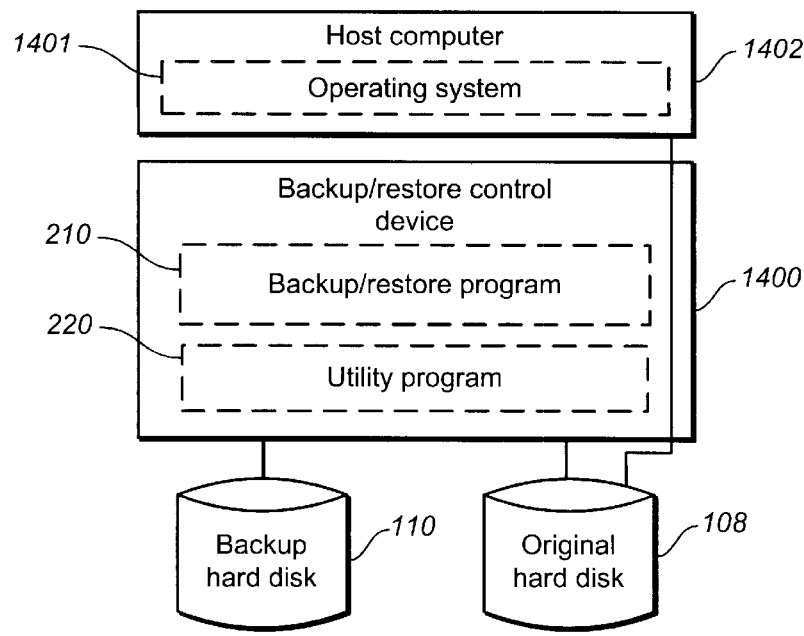
FIG._14
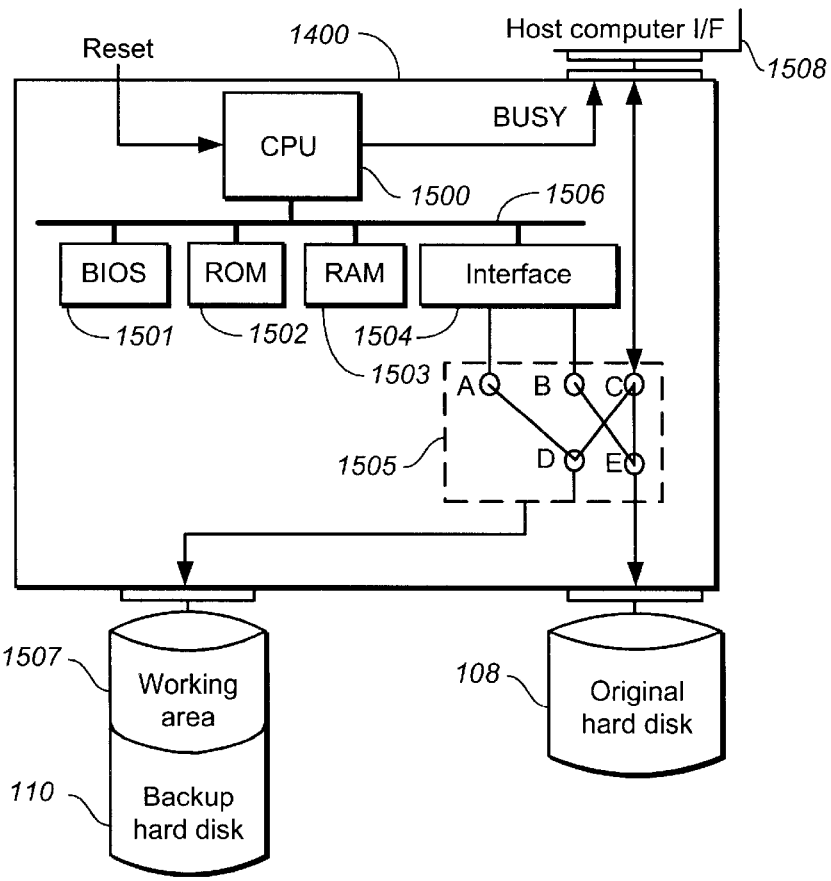
FIG._15

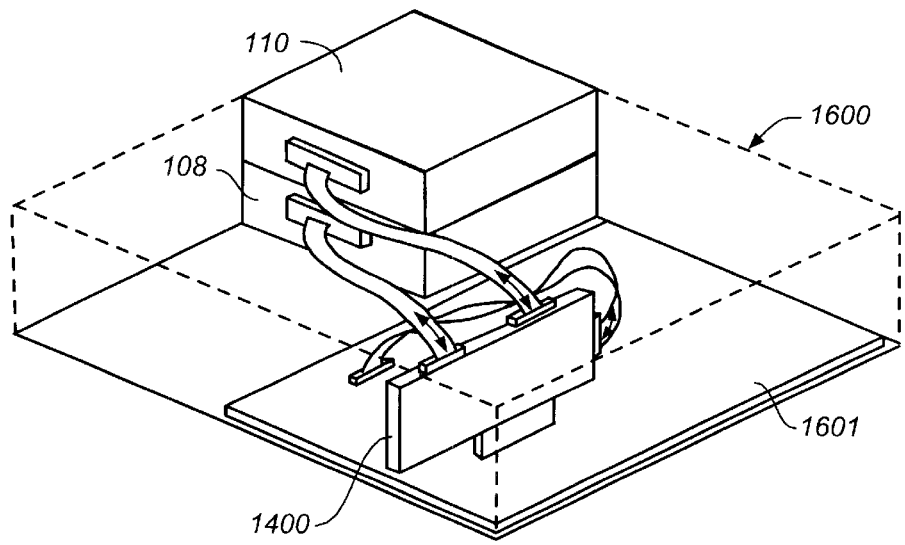
FIG._16
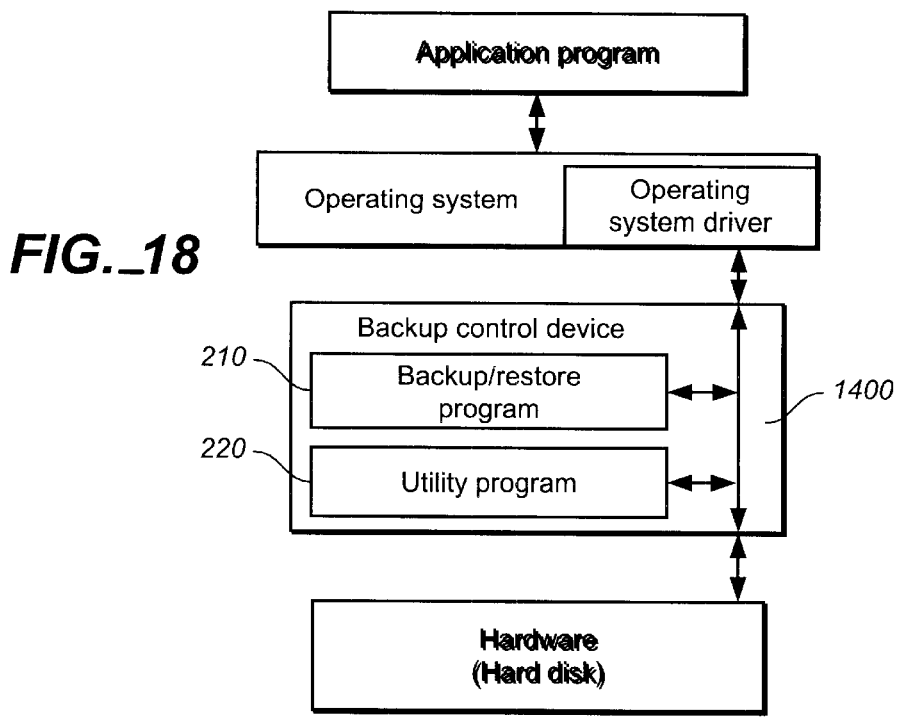
FIG._18

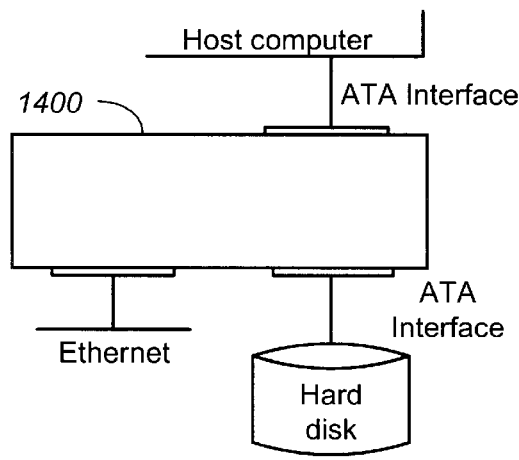
FIG._19
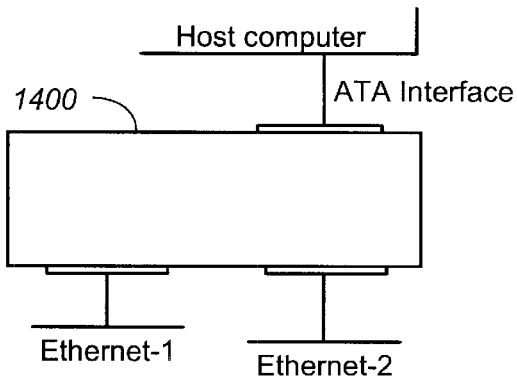
FIG._20
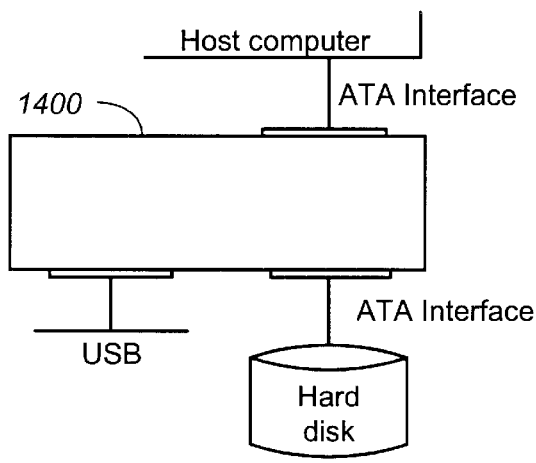
FIG._21
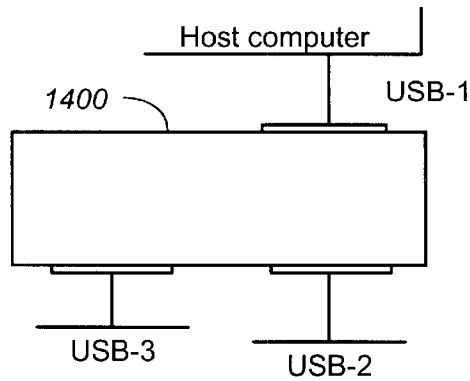
FIG._22

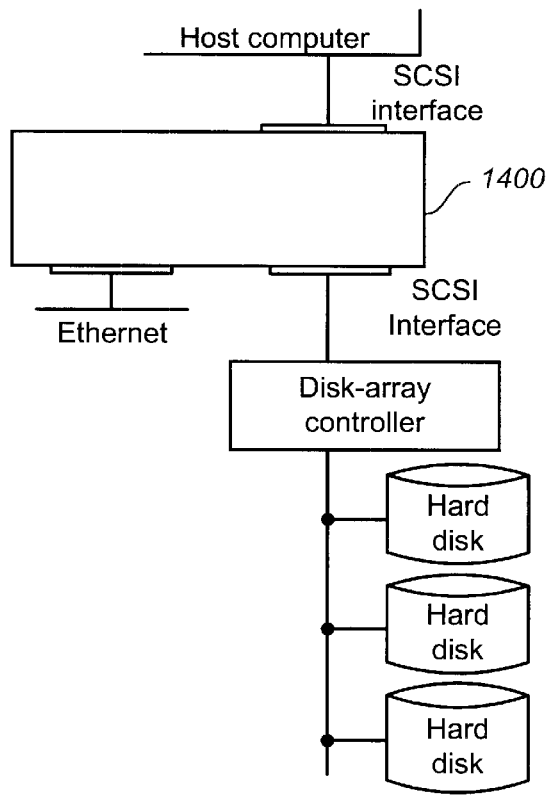
FIG._23
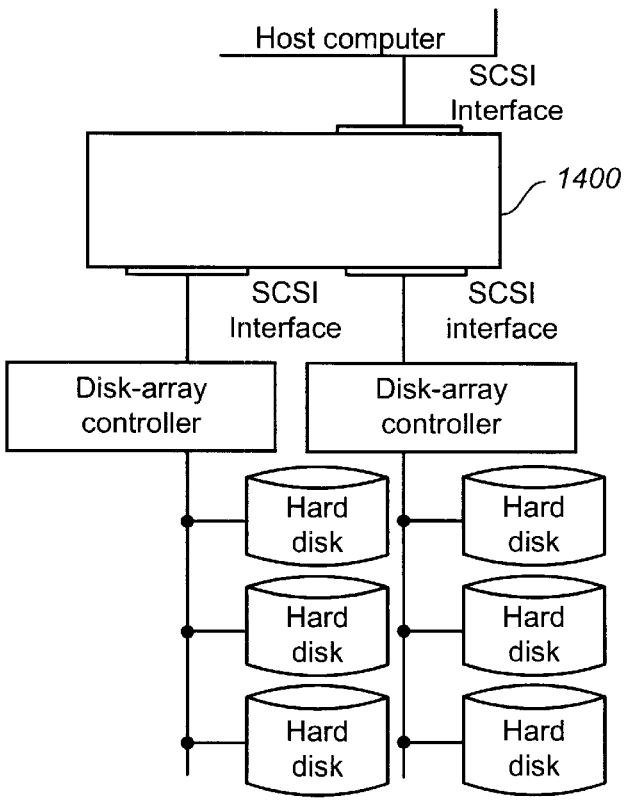
FIG._24

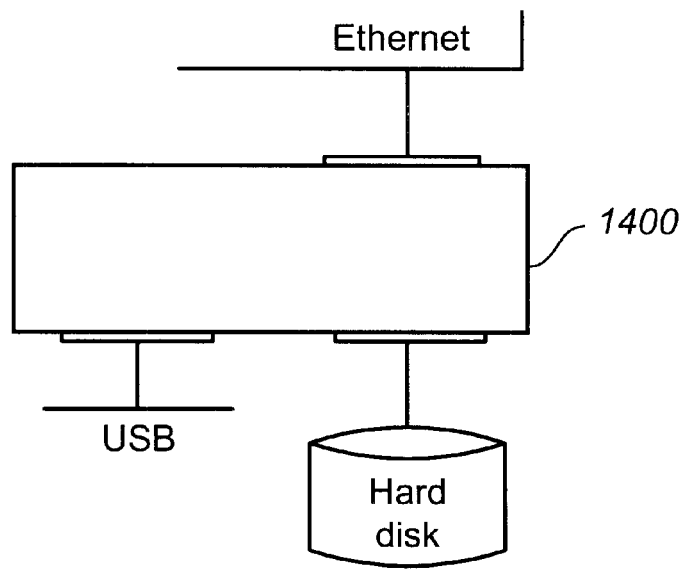
FIG._25
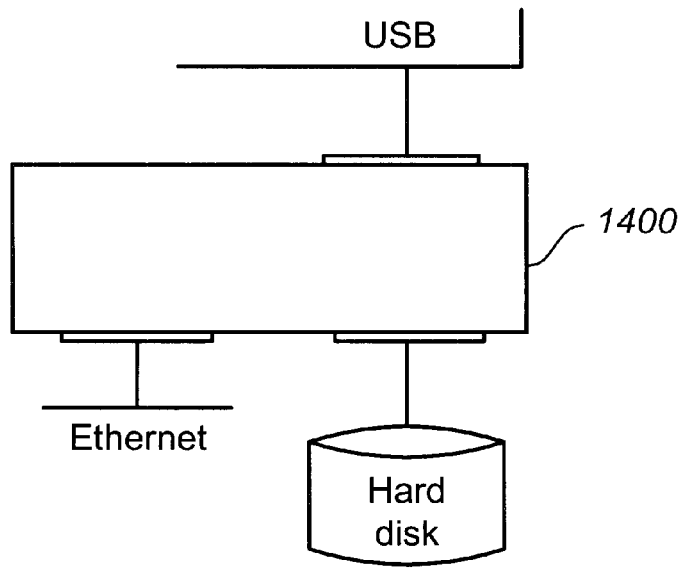
FIG._26

METHOD AND CONTROL APPARATUS FOR FILE BACKUP AND RESTORATION

TECHNICAL FIELD

This invention pertains to a backup/restore method and its control apparatus that can generate backup file(s) automatically for each file stored in the recording medium, and enable easy restoration of the original file(s) to a state of designated time period backing from the current time, as well as a computer-readable recording medium including such backup/restoration program.

BACKGROUND ART

Backup shall mean to make a copy of data and/or program (s), i.e. to make an identical copy of data and/or program(s) stored on a recording medium such as hard disk drive or floppy diskette, to another recording medium so as to prevent from file destruction due to hardware trouble and malfunctions, or accidental infection by (a) computer virus (es).

One example expressing the technology pertaining to such backup is, Japanese Patent Laid-Open Publication No. SHO 59-108159 on "magnetic disk control apparatus." The magnetic disk device disclosed in this Publication pertains to a method of storing the block address of a fixed magnetic disk device upon receiving a backup instruction from a processor unit, and, a storing method to temporarily store the contents of a fixed magnetic disk device or a backup storage device, and, a control method to give instruction to (1) a storage method, (2) a temporary storage method, (3) fixed hard disk device(s) and (4) backup storage device(s) upon receiving backup instruction(s) and/or a read/write instruction(s) from a processor unit. This magnetic disk device claims to have an advantage in that the system usage becomes more efficient, and can integrate a more economical computer system, because the processing unit need not be fully occupied (for backup operation) when making backup(s).

Also, another example is, Japanese Patent Laid-Open Publication No. HEI 3-232012 on "hard disk device with backup mechanism. The hard disk device with backup mechanism as disclosed in this Publication includes (1) a hard disk device as an external storage device to its host processor unit, (2) a backup device to backup this hard disk, (3) an interface to interact with the host processor unit, (4) a button to activate backup operation, and (5) a backup control mechanism to read the data from hard disk device and store them into the backup device while the interface mechanism prevents receiving any commands from the host processor unit, if the hard disk device and the backup device is usable at time when the button is pushed. It claims to have an advantage that this hard disk device with backup mechanism can independently make backup(s) even if there is no backup program running on the host processor unit, and/or make backup(s) even when the host processor unit is in use for other operations.

However, although the above-mentioned Japanese Patent Laid-Open Publication No. SHO 59-108159 "magnetic disk control apparatus" has an advantage that it will not occupy the host system to make backups, it has a problem in that it is a straight sector to sector image copy of the hard disk device, and cannot make backup(s) of individual file(s) that the user may want, making it inconvenient to use. Thereby, a straight sector to sector image copy of the hard disk device cannot satisfy the requirement of the users because the users have various requests, such that they may not need to backup an executable file, or want to back up certain data files more frequently than others.

In case of Japanese Patent Laid-Open Publication No. HEI 3-232012 "hard disk device with backup mechanism," it has an advantage that it can independently make backup(s) even if there is no backup program running on the host processor unit, and/or make backup(s) even when the host processor unit is in use for other operations, but has a problem in that it is strictly possible under a single tasking OS (operating system) and this device cannot make backup (s) under multi-tasking OS, which is the main stream these days. In other words, under multi-tasking OS, multiple tasks access the hard disk frequently and independently, thereby it is virtually impossible to prohibit receiving commands from the host processor unit and make a backup of the whole hard disk. In addition, the Japanese Patent Laid-Open Publication No. HEI 3-232012 on "hard disk device with backup mechanism" as well as Japanese Patent Laid-Open Publication No. SHO 59-108159 "magnetic disk control apparatus" had a problem that it cannot make backup of individual file(s) that the user may want because it merely makes a sector to sector image copy of the whole hard disk.

Also, under traditional backup device as in Japanese Patent Laid-Open Publication No. HEI 3-232012 on "hard disk device with backup mechanism" and Japanese Patent Laid-Open Publication No. SHO 59-108159 on "magnetic disk control apparatus," it is common to designate the backup timing as "make backup now" or "make backup on certain future time (such as 0:00AM tonight, or every Sunday at 0:00AM)," so it can easily restore the disk to the state when backup was last made, but it cannot restore a certain file to a state of designated time (such as one hour ago from current time).

Furthermore, the method as in Japanese Patent Laid-Open Publication No. HEI 3-232012 on "hard disk device with backup mechanism" as well as Japanese Patent Laid-Open Publication No. SHO 59-108159 on "magnetic disk control apparatus" had a problem where it makes a backup copy "as is" at the time immediately when the instruction is given from the host system or when the "backup button" is pushed, even if the hard disk is infected by a virus or certain data is already corrupted (destroyed). In other words, even when the hard disk is infected by a virus or certain data is already corrupted (destroyed), it still makes a backup of these invalid data, so when the system is restored using that invalid data, it will not completely recover to a usable state.

Accordingly, this invention was made in consideration to above, where the first objective is to enable automatic generation of (a) backup copy(ies) on a "file to file basis" for data stored in the recording medium.

Then, the second objective is, even in case the files are stored in a recording medium under control of a multi-tasking OS, to enable automatic generation of (a) backup(s) without interfering the access of the multi-tasking OS to this recording medium.

Then, the third objective is, to enable easy restoration of the original file(s) to a state of designated time period backing from the current time, using the backed-up file(s).

Then, the fourth objective is, while this invention makes possible to easily restore the files to a state of designated time period backing from the current time, to enable the management of past state of these files using the backed-up copy(ies).

Furthermore, the fifth objective is, for those files selected to make (a) backup(s) of, to check if the file(s) are infected by a virus and/or corrupted (destroyed) before making (a) backup copy(ies) so as to assure the integrity of that/those file(s).

DISCLOSURE OF INVENTION

The backup/restore method as descried in this invention is a backup/restore method consisting of, (1) a "backup copy generating process" where a random file stored in the first storage device is copied to a second storage device to make a backup copy, and (2) a "restore process" where such backup copy generated by the above-mentioned "backup copy generating process" is used to restore (an) existing file(s) or (a) non-existing (i.e., already deleted) file(s) in the first storage device, and (3) a "restore detail instructing process" where the target file (file name) and time period is designated to execute the above-mentioned "restore process" to restore those file(s) to a state of designated time period backing from the current time, and (4) a "restore control process" where, in case a "restore process" is executed during the above-mentioned "restore detail instructing process," one file that meets the designated "file name" and "time period" criteria is selected and control the execution of the above-mentioned "restore process."

Also, the backup/restore method in this invention includes, furthermore, a "full backup generation control process" where backup copies of all the files in the first storage device are made to the second storage device under pre-set condition and/or as designated by the user to control the execution of above-mentioned "backup copy generating process."

Also, the backup/restore method as in this invention includes, furthermore, a "backup file selecting process" to pre-select the file(s) to generate backup(s) of, and a "backup generation control process" to control the execution of above-mentioned "backup generation process" so as to generate a backup copy at pre-set timing every time the designated file(s) selected during the above-mentioned "backup file selecting process" is/are created or updated.

Also, the backup/restore method as in this invention includes, furthermore, an "elapsed time setting process" where at least one elapsed time (time elapsed since the last modification time) be set for each file as selected by above-mentioned "backup file selecting process," and an "elapsed time judgement process" where it will compare the current time and the last modification time for files as selected by above-mentioned "backup file selecting process" and judge whether it has exceeded each of the elapsed time as set on above-mentioned "elapse time setting process" for that particular file, and a "status recording process" where if, during the above-mentioned "elapsed time judgement process," a file has been judged that the elapsed time exceeded the pre-set time, it will record the status of the file (that this file has already exceeded the pre-set time) using the backup copy of that file, and then the above-mentioned "restore detail instructing process" will, from the files that are known to have exceeded the elapsed time as a result of above-mentioned "status recording process," select the file(s) to restore and designate the above-mentioned time period, and then execute the "restore process," wherein, the above-mentioned "restore control process" will select the copy of the backup file matching that elapsed time a designated by the above-mentioned "restore detail instructing process," control the "restore process" and restore the designated file.

Also, the backup/restore method as in this invention includes, furthermore, an "integrity judgement process" where it will judge the integrity of the designated file when making a backup copy of such file during the "backup copy generating process," and only if the result of above-mentioned "integrity judgement process" prove to be positive (i.e. not infected by a virus or destroyed,) then it will generate a backup copy of the designated file.

Also, the backup/restore method as in this invention includes, furthermore, a "compression/encryption process" to compress and/or encrypt the file(s) being generated, when making backup copy(ies) of the files designated by the above-mentioned "backup copy generation process."

Also, the backup/restore method as in this invention includes, furthermore, an "integrity judgement process" where it will judge the integrity of the designated backup file when restoring such file during the "restore process," and only if the result of above-mentioned "integrity judgement process" prove to be positive (i.e. not infected by a virus or destroyed,) then it will restore the designated file using the above-mentioned backup file.

Also, the backup/restore method as in this invention includes, furthermore, a "de-compression/decryption process" to de-compress and/or decrypt the file(s) if the file(s) is/are compressed and/or encrypted, when restoring the file(s) designated by the above-mentioned "restore process."

Also, the backup/restore method as in this invention will, when the above-mentioned "restore detail instructing process" call the above-mentioned "restore process," allow the user to select whether to replace the file (if a same filename exists in the designated directory) or create a new file (under a different directory or change the filename), and when the user select to replace the file during the above-mentioned "restore detail instructing process", the above-mentioned "restore control process" will control the execution of above-mentioned "restore process," use the appropriate backup copy and replace the designated file on first storage device, or when the user select to create a new file, the above-mentioned "restore control process" will control the execution of above-mentioned "restore process," use appropriate backup copy and create a new independent file on the first storage device.

Also, the backup/restore method as in this invention will have the above-mentioned "full backup generation control process" or "backup generation control process" watch the access of above-mentioned first storage device, and when the first storage device is not accessed, it will control the execution of above-mentioned "backup copy generating process," and make a backup copy to the second storage device.

The backup/restore control apparatus as descried in this invention is a backup/restore control apparatus that controls the execution of the "backup copy generating process" and "restore process" by controlling (1) a "backup copy generating means" where a random file stored in the first storage device is copied to a second storage device to make a backup copy, and (2) a "restore means" where such backup copy generated by the above-mentioned "backup copy generating means" is used to restore (an) existing file(s) or (a) non-existing (i.e., already deleted) file(s) in the first storage device, and (3) a "restore detail instructing means" where such file (file name) and time period is designated to execute the "restore process" of the above-mentioned "restore means" to restore those files to a state of designated time period backing from the current time, and (4) a "restore control means" where, in case a "restore process" is executed during the above-mentioned "restore detail instructing means," one file that meets the designated "file name" and "time period" criteria is selected and control the execution of the above-mentioned "restore means"

Also, the backup/restore control apparatus in this invention includes, furthermore, a "full backup generation control means" where backup copies of all the files in the first storage device are made to the second storage device under pre-set condition and/or as designated by the user to control the above-mentioned "backup copy generating means."

Also, the backup/restore control apparatus as in this invention includes, furthermore, a "backup file selecting means" to pre-select the file(s) to generate backup(s) of, and a "backup generation control means" to control the above-mentioned "backup generation means" so as to generate a backup copy at pre-set timing every time the designated file(s) selected during the above-mentioned "backup file selecting means" is/are created or updated.

The backup/restore control apparatus as in this invention includes, (1) a "backup copy generating means" where a random file stored in the first storage device under control of a host processor unit is copied to a second storage device to make a backup copy, and (2) a "restore means" where such backup copy generated by the above-mentioned "backup copy generating means" is used to restore (an) existing file(s) or (a) non-existing (i.e., already deleted) file(s) in the first storage device, and (3) a "restore detail instructing means" where such file (file name) and time period is designated to execute the "restore process" of the above-mentioned "restore means" to restore those files to a state of designated time period backing from the current time, and (4) a "restore control means" where, in case a "restore process" is executed during the above-mentioned "restore detail instructing means," one file that meets the designated "file name" and "time period" criteria is selected and control the execution of the above-mentioned "restore means."

Also, backup/restore control apparatus in this invention includes, furthermore, a "full backup generation control means" where backup copies of all the files in the first storage device are made to the second storage device under pre-set condition and/or as designated by the user to control the above-mentioned "backup copy generating means" while watching the above mentioned host processor unit access to the above mentioned first storage device, and sense that the host processor unit is not accessing the first storage device.

Also, the backup/restore control apparatus as in this invention includes, furthermore, a "backup file selecting means" to pre-select the file(s) to generate backup(s) of, and a "backup generation control means" to control the above-mentioned "backup generation means" so as to generate a backup copy at pre-set timing every time the designated file(s) selected during the above-mentioned "backup file selecting means" are created or updated, and while the above-mentioned "backup generation control means" watch the above-mentioned host processor unit access to the above-mentioned first storage device, and sense that the host processor unit is not accessing the first storage device, control the above-mentioned "backup copy generating means" to generate the backup copy.

Also, the backup/restore control apparatus as in this invention includes, furthermore, an "elapsed time setting means" where at least one elapsed time (time elapsed since the last modification time) be set for each file as selected by above-mentioned "backup file selecting means," and an "elapsed time judgement means" where it will compare the current time and the last modification time for files as selected by above-mentioned "backup file selecting means" and judge whether it has exceeded each of the elapsed time as set on above-mentioned "elapse time setting procedure" for that particular file, and a "status recording means" where if, during the above-mentioned "elapsed time judgement means," a file has been judged that the elapsed time exceeded the pre-set time, it will record the status of the file (that this file has already exceeded the pre-set time) using the back copy of that file, and then the above-mentioned "restore detail instructing means" will, from the files that are known to have exceeded the elapsed time as a result of above-mentioned "status recording means," select the file(s) to restore and designate the above-mentioned time period, and then execute the "restore process" of "restore means," then, the above-mentioned "restore control means" will select the copy of the backup file matching that elapsed time as designated by the above-mentioned "restore detail instructing procedure," control the "restore procedure" and restore the designated file.

Also, the backup/restore control apparatus as in this invention includes, furthermore, an "integrity judgement means" where it will judge the integrity of the designated file when making a backup copy of such file during the "backup copy generating means," and only if the result of above-mentioned "integrity judgement means" prove to be positive (i.e. not infected by a virus or destroyed,) then the above-mentioned "backup copy generating means" will generate a backup copy of the designated file Also, the backup/restore control apparatus as in this invention includes, furthermore, a compression/encryption means" to compress and/or encrypt the file(s) being generated, when making backup copy(ies) of the files designated by the above-mentioned "backup copy generation means."

Also, the backup/restore control apparatus as in this invention includes, furthermore, an "integrity judgement means" where it will judge the integrity of the designated backup file when restoring such file during the "restore means," and only if the result of above-mentioned "integrity judgement means" prove to be positive (i.e. not infected by a virus or destroyed,) then it will restore the designated file using the above-mentioned backup file.

Also, the backup/restore control apparatus as in this invention includes, furthermore, a "de-compression/decryption means" to de-compress and/or decrypt the file(s) if the file(s) is/are compressed and/or encrypted, when restoring the file(s) designated by the above-mentioned "restore means."

Also, the backup/restore control apparatus as in this invention will, when the above-mentioned "restore detail instructing means" execute the above-mentioned "restore process" of "restore means," allow the user to select whether to replace the file (if a same filename exists in the designated directory) or create a new file (under a different directory or change the filename), and when the user select to replace the file during the above-mentioned "restore detail instructing means", the above-mentioned "restore control procedure" will control the execution of above-mentioned "restore means," use the appropriate backup copy and replace the designated file on first storage device, or when the user select to create a new file, the above-mentioned "restore control means" will control the execution of above-mentioned "restore means," use appropriate backup copy and create a new independent file on the first storage device.

The computer-readable recording medium storing the backup/restore program as descried in this invention is a computer-readable recording medium storing a backup/ restore program to execute under a computer (1) a "backup copy generating procedure" where a random file stored in the first storage device is copied to a second storage device to make a backup copy, and (2) a "restore procedure" where such backup copy generated by the above-mentioned "backup copy generating procedure" is used to restore (an) existing file(s) or (a) non-existing (i.e., already deleted) file(s) in the first storage device, and (3) a "restore detail instructing procedure" where such file (file name) and time period is designated to execute the above-mentioned "restore procedure" to restore those files to a state of designated time period backing from the current time, and (4) a "restore control procedure" where, in case a "restore procedure" is executed during the above-mentioned "restore detail instructing procedure," one file that meets the designated "file name" and "time period" criteria is selected and control the execution of the above-mentioned "restore procedure."

Also, the computer-readable recording medium storing the backup/restore program as descried in this invention includes, furthermore, a "full backup generation control procedure" where backup copies of all the files in the first storage device are made to the second storage device under pre-set condition and/or as designated by the user to control the execution of above-mentioned "backup copy generating procedure."

Also, the computer-readable recording medium storing the backup/restore program as descried in this invention includes, furthermore, a "backup file recording procedure" to record the file(s) when the target file(s) is/are designated, and a "backup generation control procedure" to control the execution of above-mentioned "backup generation procedure" so as to generate a backup copy at pre-set timing every time the designated file(s) selected during the above-mentioned "backup file selecting procedure" is/are created or updated.

Also, the computer-readable recording medium storing the backup/restore program as descried in this invention includes, furthermore, an "elapsed time recording procedure" where at least one elapsed time (time elapsed since the last modification time) be recorded for each file as recorded by above-mentioned "backup file recording procedure," and an "elapsed time judgement procedure" where it will compare the current time and the last modification time for files as recorded by above-mentioned "backup file recording procedure" and judge whether it has exceeded each of the elapsed time as recorded on above-mentioned "elapse time recording procedure" for that particular file, and a "status recording procedure" where if, during the above-mentioned "elapsed time judgement procedure," a file has been judged that the elapsed time exceeded the pre-set time, it will record the status of the file (that this file has already exceeded the pre-set time) using the backup copy of that file, and then the above-mentioned "restore detail instructing procedure" will, from the files that are known to have exceeded the elapsed time as a result of above-mentioned "status recording procedure," accept the selection of file(s) to restore, accept the above-mentioned elapsed time parameter for each file, and accept the execution of restore procedure, then, the above-mentioned "restore control procedure" will select the copy of the backup file(s) out of the file(s) matching the elapsed time as designated by the above-mentioned "restore detail instructing procedure," control the "restore procedure" and restore the designated file.

Also, the computer-readable recording medium storing the backup/restore program as descried in this invention includes, furthermore, an "integrity judgement procedure" where it will judge the integrity of the designated file when making a backup copy of such file during the "backup copy generating procedure," and only if the result of above-mentioned "integrity judgement procedure" prove to be positive (i.e. not infected by a virus or destroyed,) then the above-mentioned "backup copy generating procedure" will generate a backup copy of the designated file.

Also, the computer-readable recording medium storing the backup/restore program as descried in this invention includes, furthermore, a "compression/encryption procedure" to compress and/or encrypt the file(s) being generated, when making backup copy(ies) of the files designated by the above-mentioned "backup copy generation procedure."

Also, the computer-readable recording medium storing the backup/restore program as descried in this invention includes, furthermore, an "integrity judgement procedure" where it will judge the integrity of the designated backup file when restoring such file during the "restore procedure," and only if the result of above-mentioned "integrity judgement procedure" prove to be positive (i.e. not infected by a virus or destroyed,) then the above-mentioned "restore procedure" will restore the designated file using the above-mentioned backup file.

Also, the computer-readable recording medium storing the backup/restore program as descried in this invention includes, furthermore, a "de-compression/decryption procedure" to de-compress and/or decrypt the file(s) if the file(s) is/are compressed and/or encrypted, when restoring the file(s) designated by the above-mentioned "restore procedure."

Also, the computer-readable recording medium storing the backup/restore program as descried in this invention will, when the above-mentioned "restore detail instructing procedure" execute the above-mentioned "restore procedure," allow the user to select whether to replace the file (if a same filename exists in the designated directory) or create a new file (under a different directory or change the filename), and when the user select to replace the file during the above-mentioned "restore detail instructing procedure", the above-mentioned "restore control procedure" will control the execution of above-mentioned "restore procedure," use the appropriate backup copy and replace the designated file on first storage device, or when the user select to create a new file, the above-mentioned "restore control means" will control the execution of above-mentioned "restore procedure," use appropriate backup copy and create a new independent file on the first storage device.

Also, the computer-readable recording medium storing the backup/restore program as descried in this invention will have the above-mentioned "full backup generation control procedure" or "backup generation control procedure" watch the access of above-mentioned first storage device, and when the first storage device is not accessed, it will control the execution of above-mentioned "backup copy generating procedure," and make a backup copy to the second storage device.

Also, the computer-readable recording medium storing the backup/restore program as descried in this invention is a program that is embedded into, as part of, the operating system, that includes such program(s) implementing the above-mentioned "restore detail instructing procedure," "restore control procedure," "full backup generation control procedure," "backup file recording procedure," "elapsed time recording procedure," "backup copy generating procedure," "elapsed time judgement procedure," "status recording procedure," "integrity judgement procedure,"

"compression/encryption procedure," or "de-compression/decryption procedure."

Also, the computer-readable recording medium storing the backup/restore program as descried in this invention is a program that is embedded into, as part of, the driver of the operating system, that includes such program(s) implementing the above-mentioned "restore detail instructing procedure," "restore control procedure," "full backup generation control procedure," "backup file recording procedure," "elapsed time recording procedure," "backup copy generating procedure," "elapsed time judgement procedure," "status recording procedure," "integrity judgement procedure," "compression/encryption procedure," or "de-compression/decryption procedure."

Furthermore, the computer-readable recording medium storing the backup/restore program as descried in this invention is, a program that is embedded into, as part of, the BIOS, that includes such program(s) implementing the above-mentioned "restore detail instructing procedure," "restore control procedure," "full backup generation control procedure," "backup file recording procedure," "elapsed time recording procedure," "backup copy generating procedure," "elapsed time judgement procedure," "status recording procedure," "integrity judgement procedure," "compression/encryption procedure," or "de-compression/decryption procedure."

BRIEF DESCRIPTION OF DRAWING

FIG. 1 is a block diagram expressing the hardware configuration of the computer that function as a backup/restore control apparatus, and realize the backup/restore method as in the first implementation of this invention, and FIG. 2 is a block diagram expressing the software configuration to make the computer function as a backup/restore control apparatus, and realize the backup/restore method as in this first implementation of this invention, and FIG. 3 is an example of a "backup criteria setting screen" under the backup/restore method and its control apparatus as in the first implementation of this invention, and FIG. 4 is an example of a "backup target file information" that manages the full path name of the files designated to make backup of, under the backup/restore method and its control apparatus as in the first implementation of this invention, and FIG. 5 is a flow chart explaining the procedure of generating backup copy(ies) of all the file(s) stored inside the original file hard disk to the backup file hard disk, under the backup/restore method and its control apparatus as in the first implementation of this invention, and FIG. 6 is a flow chart explaining the procedure of generating backup copy(ies) of the target file(s) selected to manage the generation in "backup criteria setting screen" in FIG. 3, under the backup/restore method and its control apparatus as in the first implementation of this invention, and FIGS. 7(a), (b), (c) are examples of "generation management table" to manage the generation of target files, under the backup/restore method and its control apparatus as in the first implementation of this invention, and FIG. 8 is a flowchart explaining the file "restore procedure," under the backup/restore method and its control apparatus as in the first implementation of this invention, and FIG. 9 is an example of "restore criteria setting screen," under the backup/restore method and its control apparatus as in the first implementation of this invention, and FIG. 10 is a block diagram of when the backup/restore program may be provided as an application program, under the backup/restore method and its control apparatus as in the first implementation of this invention, and FIG. 11 is a block diagram of when the backup/restore program may be provided as a module comprising the operating system, under the backup/restore method and its control apparatus as in the first implementation of this invention, and FIG. 12 is a block diagram of when the backup/restore program may be provided as a driver extending the operating system, under the backup/restore method and its control apparatus as in the first implementation of this invention, and FIG. 13 is a block diagram of when the backup/restore program may be provided as a module comprising the BIOS, under the backup/restore method and its control apparatus as in the first implementation of this invention, and FIG. 14 is a conceptual composition diagram of the backup control apparatus, as in the second implementation of this invention, and FIG. 15 is a hardware block diagram of the backup control apparatus, as in the second implementation of this invention, and FIG. 16 is an example of how the devices may be set, as in the second implementation of this invention, FIG. 18 is a diagram explaining how FIGS. 10–13 may correspond, with backup/restore control apparatus as in second implementation, and FIG. 19 is another example of the backup/restore control apparatus as in second implementation, and FIG. 20 is another example of the backup/restore control apparatus as in second implementation, and FIG. 21 is another example of the backup/restore control apparatus as in second implementation, and FIG. 22 is another example of the backup/restore control apparatus as in second implementation, and FIG. 23 is another example of the backup/restore control apparatus as in second implementation, and FIG. 24 is another example of the backup/restore control apparatus as in second implementation, and FIG. 25 is another example of the backup/restore control apparatus as in second implementation, and FIG. 26 is another example of the backup/restore control apparatus as in second implementation.

BEST MODE FOR CARRYING OUT THE INVENTION

Figure 17:
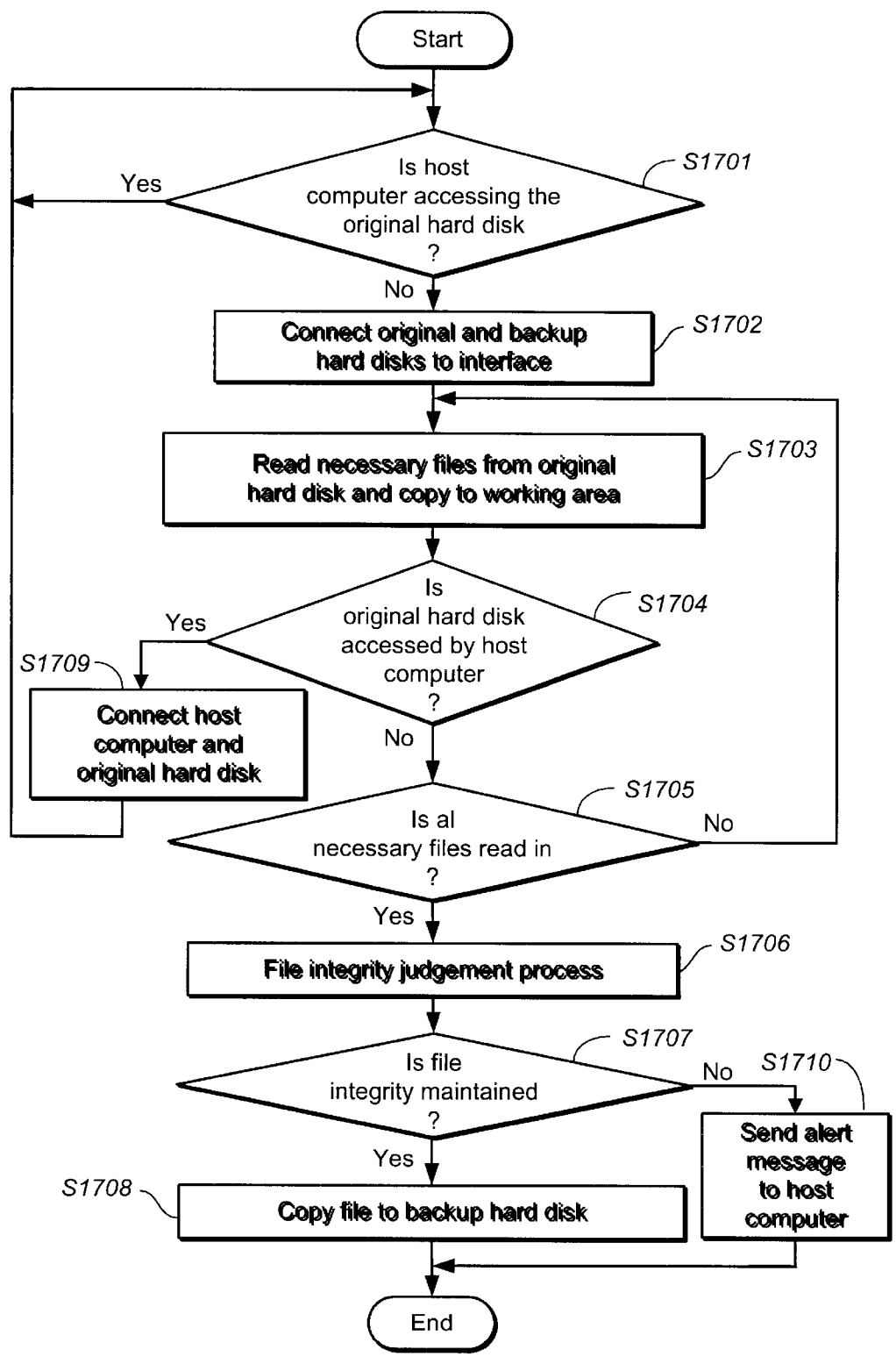
FIG. 17 is a flow chart explaining the procedure of copying all the files stored in the original file hard disk to backup file hard disk, as in the second implementation of this invention.

In order to explain this invention in detail, corresponding diagrams will be referred.

FIG. 1 is a block diagram expressing the hardware configuration of the computer that function as a backup/restore control apparatus, and realize the backup/restore method as in the first implementation. The computer 100 in FIG. 1 has, a Central Processing Unit ("CPU") 101 that reads and executes various programs as mentioned below, a Read Only Memory ("ROM") 102 that store the boot program, a Random Access Memory ("RAM") 103 that the CPU 101 will use as a working area, a display monitor 104 that displays various setting screen as mentioned below, a keyboard 105 and mouse 106 to input various commands to the computer 100, a original file hard disk 108 that store various system files, executable files and data files that is connected via Interface ("I/F") 107, a backup file hard disk 110 that store the generated backup copy of the files stored in the original file hard disk 108, that is connected via I/F 109, and a bus 111 that connects the above-mentioned components.

In FIG. 1, the I/F 107 and 109 can be Advanced Technology Attachment ("ATA"), Small Computer System Interface ("SCSI"), 1394 or any other I/F; the type of I/F does not matter. Also, in FIG. 1, two I/Fs 107 and 109 is used, but if the I/F allows two hard disks to be connected (such as being daisy chained,) then just one I/F 107 could be used. Furthermore, if the I/F 107 and/or 109 is a Local Area Network ("LAN") board or such, and through a network such as Ethernet connected to the file server, the file server could be used as the original file hard disk 109 and/or backup file hard disk 110.

Also, in FIG. 1, the original file hard disk 106 and backup file hard disk 110 that corresponds to the first and second storage devices respectively are indicated, but it does not limit the hard disk to be two; it can be one or more than three. The reason is because, in this invention, using the expression "a file stored in the first storage device is copied to the second storage device to make a backup file," could mean that, when a backup copy is being generated, it may merely be copied onto a different area of the same hard disk, from where the original file was stored. Furthermore, in FIG. 1, hard disks such as the original file hard disk 108 and backup file hard disk 110 is mentioned as an example of the storage medium, but the storage medium is not limited to a hard disk, but could be a floppy diskette, IC card, silicone disk and any other media that can be read/written from/to.

Furthermore, the computer 100 as in FIG. 1 is not limited to a desktop PC, but could be a notebook type PC. If in case the computer 100 is a notebook type PC, then the backup file hard disk could be connected, for example, via PC-Card (f/k/a Personal Computer Memory Card International Association ("PCMCIA") or printer port to a file server on the network (Ethernet) and use the file server as a backup file hard disk 110.

FIG. 2 is a block diagram expressing the software configuration to make the computer function as a backup/restore control apparatus, and realize the backup/restore method as in the first implementation of this invention. Under the backup/restore method and the control apparatus thereof in the first implementation, it has an OS 200 that control the programs and manage the input/output, backup/restore program 210 that control the backup file(s) generation process and restore process, a utility program 220 that includes various programs such as virus checking, compression/decompression and encryption/decryption programs.

The OS 200, backup/restore program and utility program 220 as indicated in FIG. 2 is, for example, stored in the original file hard disk 108, and read and executed by CPU 101.

The OS 200 in FIG. 2 can be a multi-tasking OS or a single-tasking OS, but under the first implementation it will be a considered a multi-tasking OS. Therefore, the process as explained below can be executed in the background during other application programs such as a word processor or a table calculation program are being executed.

The backup/restore program 210 has, a backup information setting unit 221 that lets the user select and register the file(s) to make backup(s) of (this is later referred to as designating the "target files" to manage the generation) as well as set at least one time period (elapsed time interval from the last modified time) of that file, and, a restore information setting unit 212 that lets the user select the file(s) to restore, as well as select the "time period" (a designated time into the past) to restore the file(s) that is/are generated the backup copy(ies) of to a state of random pre-designated time in the past backing from the current time, and execute the restore process, and, a detailed information setting unit 213 to set the below-mentioned various processing information, and, a backup/restore execution control unit 214 that controls the execution of backup copy generation and restoring process by issuing a service request to the OS 200 for making backups or restoring the designated file(s), according to the information set by backup information setting unit 211 or restore information setting unit 212, and, a generation management unit 215 that manages the past state of each pre-designated file(s), wherein the last modification time and the current time is compared for file(s) as set by the backup information setting unit 211, and judge whether the pre-set elapsed time interval (as set by the backup information setting unit 211) has already past or not, and if it is judged that the pre-set elapsed time interval has past, then, the status (that the pre-set elapsed time interval has past) for these file(s) for that time period is recorded, and, a file monitoring unit 216 that monitors the file(s) that has been set by the backup information setting unit 211 to make (a) backup copy(ies) of, wherein it will request to the backup/restore execution control unit 214 to generate (a) backup copy(ies) of those file(s) every time those file(s) is/are being created or being modified, and requests to the generation management unit 215 to manage the past status of these file(s).

Furthermore, for all file(s) selected to make a backup copy of, the generation management unit 215 manages a table to keep the state information of the backup file(s), wherein, when the pre-set elapsed time interval pass after the original file is lastly modified, it will register that backup copy as a version (a state) of the original file, for that time period backing from the current time. (Note that the time indication is not absolute time, but relative to the current time.)

For example, assume that the pre-set time period (the elapsed time after last modification) is one hour, and the last modification time for a certain file was 10:00; thereby the backup copy of that file was made at 10:00. That is, as will be mentioned later, a backup copy will always be made at certain timing (as quickly as possible) after the file was modified, for the all file(s) designated under backup information setting unit 211.

When it becomes 11:00, the generation management unit 215 will register the 10:00 version of the backup copy as a "1 hour ago" version of that file at 11:00. Therefore, even if the original file was modified once more at 10:30, the generation management unit 215 has registered (at 11:00) the 10:00 version backup copy as a "one hour ago version," so it can easily revert back to a state of that file one hour ago. Assume that the file was modified at 10:30, then, at 11:30, when one hour pass from 10:30, the generation management unit will register the 10:30 version backup copy as a "one hour ago version" of that file, and update the table that it manages. Assume that the current time is 11:15, then the "one hour ago version" that the generation management unit has in its table is the 10:00 copy, but in this case, the file has not been modified in between 10:00 and 10:15, so the "one hour ago version" at 11:15 still remains the same and 10:00 copy can be used to restore the file to its state one hour ago.

In the following explanation, the state of the file(s) that the generation management unit 215 manages as in above example will be called the "generation" of the original file, and managing the past state of the original file(s) will be called "generation management." Also, in backup information setting unit 211, selecting the file to make backup of is also referred to as selecting a "target file" to manage the generation.

Also, in the utility program 220, the virus checking program 221 is called when the backup copy is generated, or when the file is restored using that backup copy file. Then, at backup generation time, it will ensure that the file(s) is/are not infected by virus, and then go through the file integrity judgement process. Also, at restore time, it will ensure that the file(s) is/are not infected by virus, and then go through the file integrity judgement process.

Likewise, the compress/decompress program 222 to compress or decompress a file, is called when the backup copy is generated, or when the file is restored using that backup copy file. Then, at backup generation time, it will compress the file to make a backup copy, and at restore time, it will decompress the backup file to its original size.

Likewise, the encryption/decryption program 223 to encrypt or decrypt a file, is called when the backup copy is generated, or when the file is restored using that backup copy file. Then, at backup generation time, it will encrypt the file to make a backup copy, and at restore time, it will decrypt the backup file to its original state.

Furthermore, in FIG. 2, the virus checking program 221, the compress/decompress program 222 and encryption/decryption program 223 is collectively referred to as utility program 220, but each of the individual programs is independent and can exist by itself. It is only referred to as utility program 220 for the sake of convenience and easy explanation. Also, when generating backup copy(ies) or restoring the file(s), whether to go through the virus checking, compression/decompression, encryption/decryption process or not can be set by the user, through the operation of detailed information setting unit 213.

Next, specific explanation will be made in sequence of (1) backup condition setting process, (2) backup copy generating process, (3) generation management, and (4) restore process, for backup/restore method and its control apparatus, realized by above-mentioned hardware and software configuration.

(1) Backup Condition Setting Process

FIG. 3 is an example of backup condition setting screen. The user, by operating the keyboard 105 and/or mouse 106, selects the "backup condition setting" from a menu or such (not shown in diagram). As a result, the backup information setting unit 211 will, through the OS, show on the display 104 a backup condition setting screen 300 as in FIG. 3. In this backup condition setting screen 300, the user will select the file(s) to manage the generation (which is another way of saying "to select the files to make backup copies of"), and also, set the elapsed time interval from the last modified time for that file. In other words, by selecting the target file(s) to manage the generation, and setting the elapsed time interval, the user can designate to which time period backing from the current time the user wants to restore.

The user can set freely the target file(s) to manage the generation, but specifically, the following can be considered.
 part of the data file(s)
 all of the data file(s)
 part of the system file(s)
 all of the system file(s)
 part of the data file(s) and system file(s)
 part of the data file(s) and all of the system file(s)
 all of the data file(s) and part of the system file(s)
 all of the data file(s) and all of the system file(s)

And the method of selecting the file(s) can be to designate specific filename(s), or as in FIG. 3 to use a wild card to designate all the file(s) in a particular directory (or folder) or to designate all file(s) with the same extension.

After the file(s) is/are selected, then the elapsed time interval from the last modified time of that file, i.e. the base time period to which the generation management unit 215 uses to manage the generation, is set. In this example, as FIG. 3 indicates, the elapsed time interval of "5 minutes," "1 hour," "1 day," "1 week," and "1 month" is set for that selected file. As a result, the generation management, as will be mentioned later, is able to restore the selected file to its state of "5 minutes ago," "1 hour ago," "1 day ago," "1 week ago," and "1 month ago" from the current time, for the file(s) selected in the backup condition setting screen 300 as indicated in FIG. 3. Further more, the elapsed time interval can be system-wide, i.e. same for all files, or can be set differently for each file. If in case the elapsed time interval is set differently for each file, then it has the advantage for the user to easily restore the files to any user requested state (time period) in the past. This setting can be done by operating the information setting unit 212. In the first implementation, for sake of easy explanation, the elapsed time interval is set system-wide, i.e. same for all files in this system.

The backup information setting unit 211, when the file selection and elapsed time interval is set by backup condition setting screen 300 as in FIG. 3, then it will generate a target file information to manage the generation, as in FIG. 4. Here, the target file information to manage the generation includes a full path name and last modified time (sometimes referred to as "time stamp") of each file that is selected. Also, if the elapsed time interval is not system-wide, i.e. can be set independently for each file, then it is necessary to let the generation management unit 215 know elapsed time interval for each file independently.

Furthermore, the user can call the detailed information setting unit 213 of backup restore program 210, to select whether to check the virus, compress/decompress and/or encrypt/decrypt a file upon generating backup copy or restoring file(s). Here, we assume that the virus checking is set.

Backup Copy Generating Process
 a) Original File Hard Disk 108 Full Backup Process First of all, by default initial setting of the backup/restore program, regardless of the target files selected to manage the generation or the elapsed time interval as explained in FIG. 3, all the files stored in the original file hard disk 108 is backed up to backup file hard disk 110. Further, this process is not limited to just the default initial setting of the backup/restore program, but the user can execute it at any time or periodically at specified interval. For example, it can be set to make a full backup of the original file hard disk 108 every Sunday at 0:00. Also, if it is not necessary to make a backup of all the files in the original file hard disk 108, then this process can be skipped.

FIG. 5 is a flow chart explaining the procedure of making a backup for all the files in the original file hard disk 108 to backup file hard disk 110.

Firstly, the backup/restore execution control unit 214 of the backup/restore program 210 will read the file(s) to make backup of from the original file hard disk 108 and request to the OS 200 to execute a process of copying them to a working area. OS 200 will, upon receiving the request from backup/restore execution control unit 21 4, read the file(s) from the original file hard disk 108 and execute a process of copying them to a working area. The working area as mention here can be a pre-designated area in the backup file hard disk 110 or in the RAM 103. Also, which files in what sequence to read/copy can be freely set/changed, so no specific explanation will be made here. However, since it initiates the virus checking program 221 in order to check the virus when generating the backup, is necessary then to read all the files that the virus checking program 221 designates every time it generates the backup up.

Then, the backup/restore execution control unit 214 initiates the virus checking program 221, check for the virus on files that were read into the working area, and execute the process (S502) to judge whether the integrity of the files are maintained or not. Also, it is possible to check whether the files that were read into the working area are corrupted (destroyed) or not.

And then, the backup/restore execution control unit 214 receives the judgement from virus checking program 221, and makes the judgement of whether the integrity of files (in the original file hard disk) is maintained or not (S503).

In step S503, if it judges that the file integrity is maintained, then the backup/restore execution control unit 214 will request to the OS 200 to execute the process of copying the files in the working area to the backup file hard disk 110. Upon receiving the request from backup/restore execution unit 214, the OS 200 will copy the files in work area to backup file hard disk 110 (S504). This way, the file initially read from the original file hard disk 108 is made a backup copy onto the backup file hard disk 110. At this time, when an executable file used for virus checking is already copied to the backup file hard disk 110, then that executable file will not be copied and destroyed.

Further, if the compression/encryption of the backup copy is selected under detailed information setting unit 213, then the compression/decompression program 222 or encryption/decryption program 223 is initiated before the above-mentioned step S504, and compress and/or encrypt the backup copy.

On the other hand, during step S503, the file is infected by a virus or corrupted (destroyed) and judge that the integrity of the files are not maintained, then the backup/restore execution control unit 214 will terminate the backup copy generating process, and output on the display 104 an alert message via the OS 200. In such case, the backup process will restart after the original file hard disk 108 is repaired.

Then, the backup/restore program 214 will judge (S506) whether the above process has been repeated on all of the files stored in the original file hard disk 108. During step S506, if it was judged that it has been repeated on all the files, then it will terminate the process as indicated in FIG. 5, and if it was judged that it has not been repeated on all the files, then it will repeat the process until all the files inside the original file hard disk 108 are made a backup copies inside the backup file hard disk 110.

b) Backup of Target Files Selected to Manage the Generation,

Next, the procedure to generate backup copies of the target files selected to manage the generation is explained. FIG. 6 is a flow chart of the process generating backup copies of the target files selected, under backup condition setting screen as in FIG. 3. Further, in FIG. 6, the steps identical to the steps in FIG. 5, the same step number is used, and detail explanation to these steps is omitted.

The file monitoring unit 216 is initiated concurrently when the computer system is initiated (powered-on), and reads in the target file information created by the backup information setting unit 211. Then, according to the target file information read in, it monitors (S602) in the background, the target files to manage the generation stored in the original file hard disk 108, and judges at certain timing whether the target files are modified or not (S603).

Further, in step S603, it not only monitors whether the files in the original file hard disk are modified or not, but if any of the file names are designated using a wild card, it will also monitor whether a file matching the condition of the wild card has been created or not.

In step S603, if the target file is judged to have been modified, then the file monitoring unit 216 will update the "last modified time" information of that file in the target file information table (S604), request to the backup/restore execution control unit 214 to generate a backup copy of that file, and request to the generation management unit 215 to manage the updated generation (S605). Further, when a file matching the condition of the wild card was newly created, the file monitoring unit 216 will write the full path name and the last modification time information of that file in the target file information table, and request to generate a backup copy of that file, and to manage the updated generation.

The backup/restore execution control unit 214 will, upon receiving the request from file monitoring unit 216, generate a backup copy of the corresponding file onto backup file hard disk 110 (S501–S505). The process on each step is already explained under FIG. 5, so it will be omitted here.

Therefore, the files designated by backup information setting unit 211 will check at a certain timing periodically with the backup/restore execution control unit 214 whether or not that file was modified, and if it was modified then a backup copy will be generated. In other words, when any of the file designated by backup information setting unit 211 is modified, then a backup copy is always generated, and the generated backup copy will be managed by each generation, as will be mentioned later.

By this method of taking a backup for all the modified file has the following advantage. That is, even if a file was infected by a virus that cannot be detected by a virus checker, it is possible to restore back to a version of that file before getting infected. But then, since there may be many versions (generations) of the backed-up files, it is very difficult to find a particular version, so in this form of implementation, a pre-defined "time period" is set at backup information setting unit 211, and restore the designated file. However, it is also possible to designate a time not pre-defined in the backup information setting unit 211 and restore a file.

Further, the backup/restore execution control unit 214 can, when generating a backup copy on the backup file hard disk 110, i.e. when copying the target file to backup had disk 110, for example, append an extension to the filename indicating the last modified date/time or the date/time when the backup copy was generated. For example, if the last modified date/time of a file "thisfile.doc" was November 6—19:30, then a backup file by name of "thisfile-.doc.1997.11 .06.19.30". By this way, adding an extension to manage the backup files makes it is possible to avoid initial infection by a virus (the type of virus that infects to a file with particular extension), as well as avoid infection to other files on the same system. Also, even when the same file is modified more than once, and multiple copies of the backup file are generated, this give way not to overwrite the previous file, and allows multiple versions of backup copies to co-exit. In the following explanation, we assume the backup file will be appended an extension as mentioned above, and explain the first implementation. Also, it does not restrict where, in the backup file hard disk 110, the backup files are created, or the type of directory structure the backup files are managed. For example, in a randomly selected directory of the backup file hard disk 108, by making an identical directory (folder) structure as the original file hard disk 108, it is possible to manage the files in a same directory structure as the original files.

Further, the process in FIG. 6 will be executed continuously until the user terminates the backup/restore program 210, or the computer is turned off.

(3) Generation Management

Next, the generation management by generation management unit 215 will be explained. As mentioned above, in the first implementation, the basis for generation management is the elapsed time interval from last modification time, and the target files to manage the generation is handled uniformly on all of the pre-selected files. In the first implementation, the default setting of elapsed time interval is "5 minutes," "1 hour," "1 day," "1 week" and "1 month" (refer to FIG. 3.) Therefore, the generation management unit 215 will, when restoring the target files to a state in the past, manage the backup files so that it can be restored to a state of 5 minutes ago, 1hour ago, 1 day ago, 1 week ago or 1 month ago from the current time (the current time when restoration is executed.)

Further, referring to FIG. 5, it is possible to start the generation management after all the files in original file hard disk 108 is backed up, but here, for the sake of easy explanation, we will just assume one new file "thisfile.doc" and explain about the generation management.

FIGS. 7(*a*)–7(*c*) explains about the generation management table used to manage the generation of backup files. For example, in the generation management table shown on FIGS. 7(*a*)–7(*c*), there is a column to register the target file name, a column to indicate the current date/time, a column to register the generation of pre-defined elapsed time interval, such as "5 minutes," "1 hour," "1 day," "1 week" and "1 month."

The generation management unit 215 will, receive a request from the file monitoring unit 216 on generation management, including such information as the full path name of the target file and last modified date/time, and prepare to manage the generation of that corresponding file. For example, the filename "thisfile.doc" will be registered (together with the directory path) in the filename column of the generation management table.

Then, it will receive from the backup/restore execution control unit 214 the full path filename of a file, when created, that has the last modified date/time as the extension, such as "thisfile.doc.1997.07.01.15.39". The generation management unit 215 continuously compare the current time and the last modified date/time of the backed-up file, and if "5 minutes" has passed, then it will register in the "5 minutes" column of FIG. 7(*a*), for example, "1997.07.01.15.39". This way, by recording the extension of the backed-up files, it can easily specify the backup file to use to restore a selected file.

Then, if "thisfile.doc." has not been modified and 1 hour from the last modification passed, then the generation management unit 215 will register the extension portion "1997.07.01.15.30" of the file "thisfile-.doc.1997.07.01.15.30" in the "1 hour" column of FIG. 7(*a*). By same method, if "1 day," "1 week" and "1 month" pass without the original file being modified, then the extension portion "1997.07.01.15.30" of the file "thisfile-.doc.1997.07.01.15.30" is registered in the "1 day," "1 week" and "1 month" column respectively.

As mentioned above, by using a generation management table as in FIG. 7(*a*), unless the original file "thisfile.doc" is modified, the "5 minutes," "1 hour," "1 day," "1 week" and "1 month" version of the backup file is actually the same, i.e. "thisfile.doc.1997.07.01.15.30". Therefore, FIG. 7(*a*) indicates that at least 1 month has past since the file "thisfile-.doc" was last modified.

Next, we will explain how the generation management is done when "thisfile.doc" is modified. The generation management unit 215 will receive a request for generation management from the file monitoring unit 216 on, and receive information such as the full path name of the target file and last modified date/time; consequently recognize that the file "thisfile.doc" was modified.

Then, the generation management unit 215 will continuously compare the current time and the last modification date/time and if it judges that 5 minutes has passed, then it will record, as in FIG. 7(*b*), "1997.08.03.11.16" into "5 minutes" column.

Then, if the file "thisfile.doc" is not modified, and 1 hour pass from the last modified date/time, then it will record the extension of the backup file made one hour ago, as in FIG. 7(*b*), "1997.08.03.11.16" into "1 hour" column. Then, if the file "thisfile.doc" is not modified, and 1 day pass from the last modified date/time, then it will record the extension of the backup file made one day ago, as in FIG. 7(*b*), "1997.08.03.11.16" into "1 day" column. In other words, FIG. 7(*b*) indicates that at least 1 day has past since the file "thisfile.doc" was modified on 1997-AUG-3 11:16. Therefore, in the "1 week" and "1 month" column, it is recorded that the state of "thisfile.doc" file 1 week ago and 1 month ago is the same backup file "thisfile-.doc.1997.07.01.15.30".

Next, let us assume that the "thisfile.doc" was modified. The generation management unit 215 will receive a request for generation management from the file monitoring unit 216 on, and receive information such as the full path name of the target file and last modified date/time; consequently recognize that the file "thisfile.doc" was modified.

Then, the generation management unit 215 will receive a report from backup/restore execution control unit 214 that the backup copy was made.on file "thisfile.doc" and that its filename is "thisfile.doc.1997.08.04.13.40". Then, the generation management unit 215 will continuously compare the current time and the last modification date/time and if it judges that 5 minutes has passed, then it will record, as in FIG. 7(*c*), "1997.08.04.13.40" into "5 minutes" column.

Further, FIG. 7(*c*) shows the state of the file "thisfile.doc" at 1997-AUG-4 14:00, and the column for "1 hour," "1 day," "1 week" and "1 month" is, until the last modification date/time for "thisfile.doc" elapse 1 hour, 1 day, 1 week and 1 month, it remains as shown in FIG. 7(*c*). In other words, for "1 hour" and "1 day" column, it is recorded that the state of the file "thisfile.doc" is same as the backup copy "thisfile.doc.1997.08.03.11.16". Then, for "1 week" and "1 month" column, it is recorded that the state of the file "thisfile.doc" is same as the backup copy "thisfile-.doc.1997.07.01.15.30".

If, thereafter, the file "thisfile.doc" is not modified for 1 month, then the file "thisfile.doc.1997.08.04.13.40" represents the state of the original file "thisfile.doc" 5 minutes, 1 hour, 1 day, 1 week and 1 month ago. In such case, the files "thisfile.doc.1997.07.01.15.30" and "thisfile-.doc.1997.08.03.11.16" may be deleted, or kept for some other usage. Whether to delete this file may also be set by operating the detailed information setting unit 213. The deletion of backup copy files will be done by backup/restore execution control unit 214 via the OS 200.

(4) Restore Process

Further, following is the explanation for the process wherein, if the files stored in original file hard disk 108, for any reasons, gets destroyed, erroneously deleted or such, then the files are restored by using the generation management function of generation management unit 215.

FIG. 8 is the flow chart for file restore procedure. The user, by operating the keyboard 105 and/or mouse 106, selects the "restore setting" from a menu or such (not shown in diagram). As a result, the restore information setting unit 212 will, read the contents of generation management table (S801) managed by the generation management unit 215, by showing on the display 104 a restore condition setting screen 900 as indicated in FIG. 9, display the file name(s) and its generation(s) available for restoration.

The user will refer to the restore condition setting screen 900, and select the file and its generation to restore, and instruct the execution of the restore process.

Additionally, the user can select one of multiple restore methods (options). In other words, as is indicated in the restore condition setting screen, the user can select to (1) rename the current file in the original file hard disk 1 08 so that the restored file will not overwrite the original file, (2) allow to overwrite the current file with the restored file, and (3) restore the backup file to a temporary directory so that it will not overwrite the current file. Also, if the user select to restore the backup file to a temporary directory, then considering that there may be a same file previously restored in the same directory, the restore information setting unit 212 can be set to alert the user if needed. If it was not set to alert the user, then the file in the temporary directory will be overwritten.

Then, the restore information setting unit 212 will judge whether the file name, generation and the restore operation is selected or not (S803), and if the file name, generation and the restore operation is selected, then it will request a restore process to backup/restore execution control unit 214 by passing the restore information such as full path file name of the restore target file and full path file name of the backup file.

As a result, the backup/restore execution control unit 214 will, by using the designated backup file, restore the designated file (S804). At that time, the backup/restore execution unit 214 will restore the files according to the backup method (option) selected in the restore condition screen 900.

Now, we will explain the restore process specifically by using the file "thisfile.doc" as an example. Assume that the current time is 1999-AUG-5 14:00, and it was selected in the restore condition setting screen 900 that the filename was "thisfile.doc" and the generation was "1 month" ago, and instructed to execute the restore process.

The restore information setting unit 212 will, from the generation management table already read in, search for the backup file of designated file ("thisfile.doc") at designated time (1 month ago). Specifically, it will look into the 1 month column of FIG. 7(c), and select the file "thisfile.doc.1997.07.01.15.30" as the backup copy.

Then the restore information setting unit 212 will request the restore execution to backup/restore execution control unit 214 by passing the restore target full path file name "c\mydoc\thisfile.doc" and the file to be used for this restoration "d\backup\mudoc\thisfile.doc.1997.07.01.15.30".

The backup/restore execution control unit 214 will, basing on the restore execution information received, read in the backup file from the backup file hard disk 110, and using that backup file copy restore the "thisfile.doc" file to the original file hard disk 108.

Furthermore, when executing the restore process, if the selection is to rename the current file in the original file hard disk 108 so that the restored file will not overwrite the original file, then it will, for example, rename the existing file to "re_thisfile.doc" and then copy the file "thisfile.doc.1997.07.01.15.30" as "thisfile.doc" to the original file hard disk 108 at its original directory, being the version of that file 1 month ago from the current time.

If the selection is to allow to overwrite the current file in the original file hard disk 108 with the restored file, then it will copy the file "thisfile.doc.1997.07.01.15.30" as "thisfile.doc" and overwrite the existing file "thisfile.doc", being the version of that file 1 month ago from the current time.

If the selection is to restore the backup file to a temporary directory so that it will not overwrite the current file, then it will copy the file "thisfile.doc.1997.07.01.15.30" to a designated temporary directory "tempdir", (refer to FIG. 9), being the version of that file 1 month ago from the current time.

Also, if the virus checking is enabled when restoring a random file using the backup copy, likewise the flow chart explanation in FIG. 5 and FIG. 6, it will initiate the virus checking program, and check the virus before copying back the backup file.

Furthermore, if the backup files are compressed and/or encrypted, then it will initiate the compression/decompression program 222 and/or encryption/decryption program 223, and decompress and/or decrypt the backup files that are compressed and/or encrypted.

As such, the first implementation of this backup/restore method and its control apparatus makes possible to manage the past state of files (managing the generation) by using the backup files, and can easily restore the original files to a state in the past backing from the current time.

Also, note that the rule is, a backup (of the target file) is made when that files is modified, and since it constantly checks whether the files are modified or not, it can make a backup automatically for each file in the original file hard disk 108.

Furthermore, it can assure the integrity of the files because it checks for the computer virus and/or judge whether the files are corrupted (destroyed) or not before making backup copies.

In the above explanation, the premises is that the first implementation of this backup restore method is realized as a software only implementation as indicated in FIG. 2. However, the software organization of each functional units as indicated in FIG. 2, especially the organization of the backup/restore program 210 is one example of how this could be implemented, and it is possible to modify or design it differently. Also, the generation management method as explained using FIG. 7 is, again, strictly an example.

Also, the organization of above-mentioned backup/restore method and its control apparatus as in this first implementation, in other words, acknowledging that FIG. 10 is a case where the backup/restore program 210 is provided as an application program, it is also possible to implement this first implementation of backup/restore method and its control apparatus differently from the organization as in FIG. 10.

FIG. 11 is explaining a case wherein the backup/restore program 210 is provided as a module comprising the OS 200. In this case, the process of backup/restore program 210 is approximately as mentioned above, but since it is provided as a module comprising the OS 200, the read/write process request from backup/restore program 210 to OS 200 is done internally within the OS 200. However, in order to execute the virus checking by virus checking program 221, it may be necessary to modify the driver to enable interfacing with the utility program 220.

Also, FIG. 12 is explaining a case wherein the backup/restore program 210 is provided as a driver extending the OS 200. Also in this case, the process of backup/restore program 210 is approximately as mentioned above.

Furthermore, FIG. 12 is explaining a case wherein the backup/restore program 210 us provided as a module comprising the BIOS (Basic Input/Output System).Also in this case, the process of backup/restore program 210 is approximately as mentioned above, but the conditions for generating the backup or such must be done under BIOS setting screen, or preferably, a special user interface program/screen to set the conditions under OS 200 must be provided.

Next, the second implementation of backup/restore method and its control apparatus will be explained. FIG. 14 is a conceptual composition diagram of the backup/restore control apparatus, in the second implementation. As in FIG. 14, the backup/restore control apparatus 1400 as in the second implementation is installed in between the host computer 1402 such as a personal computer (corresponding to the host processor unit in this invention) and the original file hard disk 108 controlled by the host computer 1402, wherein it generates a backup copy of the files stored in the original file hard disk 108 onto the backup file hard disk 110, as well as use the backup files generated in the backup file hard disk 110 to restore the files onto the original file hardwdisk 108.

Here, the backup/restore control apparatus 1400 reads the information stored in the original file hard disk 108 on a file by file basis, then backup the files read-in onto the backup file hard disk 110, and is equipped with the backup/restore program 210, the utility program 220 including the virus checking program 221, compression/decompression program 222 and encryption/decryption program 223 as explained in the first implementation of this invention.

Moreover, the detail of the backup/restore program 210 and the utility program 220 is explained in the first implementation using FIG. 2 and such, so the explanation is omitted here.

Also, in order to manage the generation using backup/restore program 210 as explained in the first implementation, it is necessary to go through the process of selecting (a) file(s) to manage the generation, and/or set the elapsed time interval from last modification time. Thereby, in the second implementation, it uses the host computer 1402 as an input means, and accordingly, part of the function comprising the backup/restore program 210 as indicated in FIG. 2 may be provided by the host computer 1402 side. On the other hand, if the backup/restore control apparatus 1400 itself provides for the input means, it is possible to directly designate the target files of generation management to the backup/restore control apparatus 1400.

Furthermore, 1401 in FIG. 14 is the OS (operating system). The OS 1401 can be a multi-tasking OS or a single-tasking OS, but under the second implementation it will be a considered a multi-tasking OS. In case of a multi-tasking OS, the access from host computer 1402 to the original file hard disk 108 occur very frequently. Therefore, a function to watch the access from host computer 1402 to the original file hard disk 108 need to be added onto the backup/restore program 210, and let the backup copy generation process and/or restore process be done while the host computer 1402 is not accessing the original file hard disk 108. FIG. 15 is a block diagram expressing the hardware configuration of the backup/restore control apparatus 1400. The backup/restore control apparatus 1400 has, a CPU 1500 that process the backup copy generation and restoration by executing the backup/restore program 210 and the utility program 220 including the virus checking program 221 as mentioned above, a BIOS 1501, a ROM 1502 that store the backup/restore program 210 and the virus checking program 221, a RAM 1503 to be used as a working area for CPU 1500, an I/F 1504 for Integrated Drive Electronics ("IDE"), SCSI or such, a switching mechanism 1505 that switch, under the control of CPU 1500, the connection between IF 1504 and the backup file hard disk 110 (A–D), the connection between I/F 1504 and the original file hard disk 108 (B–E), the connection between original file hard disk 108 and the host computer I/F 1508 (C–E), and the connection between backup file hard disk 110 and the host computer I/F 1508 (C–D), and a bus 1506 that connects the above-mentioned components.

Furthermore, in FIG. 15, hard disks such as the original file hard disk 108 and backup file hard disk 110 is mentioned as an example of the storage media, but the storage medium is not limited to a hard disk, but could be a floppy diskette, IC card, silicone disk and any other media that can be read/written from/to. Also, as explained in the first implementation, the hard can be one or more than three.

Also, inside the backup file hard disk 110, there is a work area 1507 that the virus checking program 221 uses to check the virus and/or destruction of the files to be backed up.

However the work area 1507 does not have to be in the backup file hard disk 110, but the RAM 1503 or such could be used as a work area instead.

Also, the backup/restore program 210 and the utility program 220 can be stored on a pre-designated area in the backup file hard disk 110, or in a flash memory (not shown in diagram) or such, instead of the ROM 1502, FIG. 16 is a sample of how the backup/restore control apparatus 1400 may be used in this second implementation. FIG. 16 indicates the backup/restore control apparatus 1400 to be used inside a personal computer, where the backup/restore control apparatus 1400 is inserted into a random slot on the motherboard. In FIG. 16, item 1600 indicates the case of a personal computer.

Next, the operation of backup/restore control apparatus 1400 in the above configuration is explained. Moreover, in this second implementation of backup/restore control apparatus 1400, the backup condition setting process, generation management and restore process is the same as in the first implementation, so the explanation is omitted here.

First of all, by default initial setting of the backup/restore control apparatus, all the files stored in the original file hard disk 108 is backed up to backup file hard disk 110. Further, this process is not limited to just the default initial setting of the backup/restore program, but the user can execute it at any time or periodically at specified interval. For example, it can be set to make a full backup of the original file hard disk 108 every Sunday at 0:00. Also, if it is not necessary to make a backup of all the files in the original file hard disk 108, then this process can be skipped.

FIG. 17 is a flow chart explaining the procedure of making a backup for all the files in the original file hard disk 108 to backup file hard disk 110.

In FIG. 17, the backup restore control apparatus 1400 watches whether the host computer 1402 is accessing the original file hard disk (S1701). Moreover, since the host computer 1402 is controlled by the multi-tasking OS, it is important in this second implementation that the backup process be automatically executed without obstructing the operation of the multi-tasking OS. Moreover, whether or not the host computer 1402 is accessing the original file hard disk 108 can be judged by checking the register and/or busy signal or such of the I/F 1508 from the host computer 1402.

And if it was judged that the host computer 1402 is not accessing the original file hard disk, the backup/restore control apparatus 1400 will control the switching mechanism 1505 and disconnect the connection between the host computer 1402 and the original file hard disk 108 (C–E), and through I/F 1504, connect the connection the original file hard disk 108 and backup file hard disk 110 (A–D, B–E) (S1702).

When the original file hard disk 108 and the backup file hard disk 110 is connected to I/F 1504, then the backup/restore control apparatus 1400 will control the I/F 1504 read the executable file(s), system file(s) and/or data file(s) from the original file hard disk 108 and copy to the work area 1507 (S1703).

At this time, if the host computer 1402 access the original file hard disk 108 (S1704), then the backup/restore control apparatus 1400 will control the switching mechanism 1505 and connect the host computer 1402 and the original file hard disk (S1709) and go back to step 1701. Then, the above process will be repeated.

On the other hand, if there is no access from the host computer 1402 to the original file hard disk 108 (S1705), then the backup/restore control apparatus 1400 will judge whether or not the necessary file(s) to make a backup has been read in (S1705). In this second implementation of backup/restore control apparatus 1400, it can be set to go though the virus checking and/or check whether the files are corrupted (destroyed) or not every time it makes a backup, so that the integrity of file(s) to copy to backup file hard disk 110 can be assured. For that reason, if going through the virus checking or such, it is necessary to read in the file(s) designated by the virus checking program 221.

Therefore, if the necessary file(s) for virus checking is/are not read in or such, then it will go back to step S1703 and repeat the reading process. On the other hand, if the necessary file(s) are read in, the it will go to the next step S1706.

At step Si 706, the backup/restore control apparatus 1400 will execute the virus checking program 211, and the check the file(s) read into the working area 507 to judge whether the integrity of the file(s) is/are maintained or not. Also, it can check whether the file(s) read in is/are corrupted (destroyed) or not.

Then, if, at step S1707, the backup/restore control apparatus 1400 judge that the integrity of the file(s) read into the working area is/are maintained, then it will copy them to the backup file hard disk 110 (S1708). This way, the backup copies of the file(s) read in from the original file hard disk 108 is/are generated. At this time, if the executable file is already copied to the backup file hard disk 110, then the executable file in the work area 107 is deleted.

Furthermore, if the compression and/or encryption option is selected, then the compression/decompression program 222 and/or encryption/decryption program 223 (refer to FIG. 2) is initiated in the procedure of step S1708, and the backup copy(ies) can be compressed and/or encrypted.

On the other hand, during step S1707, if the backup/restore control apparatus 1400 judge, that the integrity of the file(s) is/are not maintained, such as being infected by a virus or corrupted (destroyed), then it will terminate the backup copy generating process, and alert the host computer 1402 (S1710). In such case, the backup process will restart after the original file hard disk 108 is repaired.

By repeating the above-mentioned process, the backup copy can be generated on all of the files stored in the original file hard disk 108 to the backup file hard disk 110.

Moreover, as to the backup file generation of target files selected manage the generation, it is already explained in the first implementation using FIG. 6, so the detail is omitted. However, in this second implementation, as was explained in FIG. 17, it is different in that judgement has to be made whether the host computer 1402 is accessing the original file hard disk 108 before the backup/restore control apparatus 1400 can access the original file hard disk 108.

Also, detailed explanation will be omitted, but in the restore process, judgement has to be made whether the host computer 1402 is accessing the original file hard disk 108 before executing the restore process.

As such, the second implementation of backup control apparatus has made it possible to automatically backup the information stored in the storage medium on a file by file basis, so the user can execute a backup process of preferred file selection.

Also, even if the target file(s) is/are stored in a original file hard disk under control of a multi-tasking OS, it can detect the state when the host computer 1402 is not accessing the original file hard disk 108 and automatically execute the backup process, it will not with obstruct the multi-tasking OS's access to the storage medium, and generate the backup files.

Also, it can assure the integrity of the files because it backs up the files only after judging whether the files are infected by a virus or not, and/or the files are corrupted (destroyed) or not.

Furthermore, it is also possible for the host computer 1402 to access the backup file hard disk 110, and in this case, it will control the switching mechanism 1505 as in FIG. 2, and connect the host computer 1402 I/F 1508 and backup file hard disk 110 (C–D).

Also, FIG. 18 is to compare with the first implementation as in FIGS. 10 to 13, and explains the corresponding composition of backup/restore control apparatus 1400 in this second implementation.

Also, FIGS. 19 to 26 are examples of this second implementation of the backup/restore control apparatus 1400, and explains how this second implementation can be used in variety of configurations. FIG. 19 is an example of using a file server on the Ethernet as one end of the original file hard disk 108 or the backup file hard disk 110, and FIG. 20 is an example of using a file server on the network as both ends of the original file hard disk 108 and the backup file hard disk 110.

FIGS. 21 and 22 is, correspond to FIGS. 19 and 20 respectively, and the Ethernet is changed to Universal Serial Bus ("USB") connection.

FIG. 23 is an example where one end of the original file hard disk 108 or the backup file hard disk 110 is connected to a disk-array controller with multiple hard disks, and the other end to a file server on the Ethernet. On the other hand, FIG. 24 is and example where both end of the hard disks are connected to a disk array controller with multiple hard disks.

FIGS. 25 and 26 are examples of connecting the backup/restore control apparatus 1400 to the network, and allow multiple computers (on the network) to use the backup/restore control apparatus 1400.

Furthermore, in this second implementation of the backup/restore control apparatus 1400, a function can be added to allow an update mechanism of the backup/restore program 210 and utility program 220 in the ROM 1502. By this function, the user can download a preferred virus checking program onto the backup restore control apparatus 1400, and use that as a standard virus checking program.

As explained above, the first and second implementation of this backup/restore method and its control apparatus, by using the backed-up files of the target files to manage the generation, can easily restore the files to a state of pre-set time in the past. However, instead of, or in addition to this method, it can be made so that the user can designate a random time in the past, and by selecting the target file, automatically identify the version of that file to restore to that state of time. In other words, not only to re-store to a pre-set time in the past as indicated in FIG. 9, but it allows to restore to any random time in the past.

Also, the first and second implementation of this backup/restore method and its control apparatus can be used in a server/client system. Note, that when the computer is used as a single stand-alone system, then all the files are assumed to be owned by that user, so designating the file to restore and its generation can be decided freely by that user. But in a server/client system, except for certain privileged users, it is necessary to limit the restoration right of the files only to the files that one owns. Therefore, in a server/client system, it is advisable to manage the files according to each user and/or the group that that user belong to, and then use the first and second implementation of this backup/restore method and its control apparatus. The unit of user management depends on the OS, but categories such as "file owner," "same group" or "all users" typically exists. Also, many OS avail a privileged user for system administration such as "superuser."

Here, the management for each users can be accomplished, for example, as below.

1. First of all, 3 system setup information is necessary.
   (1) The user has to designate the target file(s) in the server to manage the generation (i.e to make backups of.)
   (2) Then, for those files, the user has to designate, the elapsed time interval from the last modification date.
   (3) Then, for each of those file(s), the use has to set the restore authorization level, such as, (a) file owner only, (b) file owner and members of the same group, (c) all users, can restore that file.

The above (1) and (2) are setup information that is needed for standalone systems too. Above (3) is a setup information needed for server/client systems only. Above (3) setup information can be managed by using a table, and table 1 as below is one example of such.

TABLE 1

| Superuser |
| File owner |
| Same group |
| All users |
| *.ini |
| *.doc |
| address.xls |
| C:¥Mydoc¥*.* |

In Table 1, it is set that "*.ini" file(s) is/are authorized for restoration only by the file owner and superuser, and other users cannot restore it/them. On the other hand, it is set that "*.doc" file(s) is/are authorized for restoration by the owner, members of the same group and superuser. Also, it is set that "addres.xls" is authorized for restoration by all users. Furthermore, the expression "C\Mydoc\*.*" will designate all the files under certain directory (in this case C\Mydoc) and it is authorized for restoration by file owner and superuser only.

2. On the other hand, when generating backup copy(ies), together with the "file name," "created date/time," "last modification date/time" and such attribute information, it is necessary to add the "user name" and "group name" to manage the generation.

3. Next, assume that a request to restore a certain file (for example, file "A") of a certain time period in the past was made from the user to the server. The server will check the name of file owner, then check whether the user and/or the group member of the user has the authority to restore file A. If that user, that made the request, or the group member of that user has the authority to restore file A, then the server will execute the restore process, if not, the server will send an alert message.

By such procedure, in the server/client system that is installed the first or second implementation of this backup/restore method and its control apparatus, the files in the server can be prevented from unauthorized restoration by random user(s) and can realize the authorization mechanism necessary for such multi-user system.

Furthermore, the first or second implementation of this backup/restore method is realized by executing the programs (backup/restore program 210, virus checking program 221, and others) prepared in advance. These programs are stored in a computer-readable storage medium such as hard disk, floppy diskette, ROM/RAM, Compact Disk—Read Only Memory ("CD-ROM"), Magneto Optical ("MO"), Digital Versatile Disk ("DVD") and others, and will be executed by reading from those storage medium. Also, these programs can be distributed by above storage medium, or distributed through a network. Furthermore, the computer as mentioned above includes not just the computer, but the operating system running on that computer.

As explained above, according to the backup/restore method as in this invention, it includes (1) a "restore detail instructing process" where the user can select the target file (for restoration) and the time in the past backing from the current time to execute the restore process, so that the files can be restored to a random time in the past, and (2) a "restore control process" wherein, when the execution of "restore process" is called by the "restore detail instructing process," select the corresponding backup file according to the designated file and time period, control the execution of "restore process" and restore the file selected for restoration, thereby, using the backup files it can restore the original files to a state in the past backing from the current time.

Also, according to the backup/restore method as in this invention, furthermore, includes a "full backup generation control process" where it will generate a backup of all the files in the first storage device to the second storage device, by controlling the execution of "backup copy generating process" according to the pre-set condition and/or the user's selection, enables the backup not only by files but the whole storage device, thereby is useful for restoring the whole storage device.

Also, according to the backup/restore method as in this invention, furthermore, includes (1) a "backup file selecting process" to pre-select the files to generate backup of, and (2) a "backup generation control process" that generate backup files at pre-set timing by controlling the execution of "backup copy generating process" every time the files as selected by "backup file selecting process" are created or modified, thereby, it can generate backup copies on a file by file basis for those files stored in the first storage device, so it can generate only the files that users want to make backups of. Therefore, it is possible to backup only the files that are more important, and not backup the files that are less important.

Also, according to the backup/restore method as in this invention, furthermore, it can use the information that was used to restore the pre-selected original files to a state of the past backing from the current time, thereby can identify the restorable state easily and increase the convenience of the restoring process, by including in this method an "elapsed time setting process" where at least one elapsed time (time elapsed since the last modification time) be set for each file as selected by the "backup file selecting process," and an "elapsed time judgement process" where it will compare the current time and the last modification time for files as selected by "backup file selecting process" and judge whether it has exceeded each of the elapsed time as set on the "elapse time setting process" for that particular file, and a "status recording process" where if, during the "elapsed time judgement process" a file has been judged that the elapsed time exceeded the pre-set time, it will record the status of the file (that this file has already exceeded the pre-set time) using the backup copy of that file, and then the "restore detail instructing process" will, from the files that are known to have exceeded the elapsed time as a result of the "status recording process," select the file(s) to restore and designate the elapsed time parameter, and then execute the "restore process," wherein, the "restore control process" will select the copy of the backup file matching that elapsed time as designated by the "restore detail instructing process," control the execution of "restore process" and restore the designated file.

Also, the backup/restore method as in this invention includes, furthermore, an "integrity judgement process" where it will judge the integrity of the designated file when making a backup copy of such file during the "backup copy generating process," and only if the result of the "integrity judgement process" prove to be positive (i.e. not infected by a virus or destroyed,) then it will generate a backup copy of the designated file, thereby can prevent a situation where the backup copies cannot be used due to infection by a virus or being corrupted (destroyed).

Also, the backup/restore method as in this invention includes, furthermore, a "compression/encryption process" to compress and/or encrypt the file(s) being generated, when making backup copy(ies) of the files designated by the "backup copy generation process," thereby can make effective usage of the storage medium as well as maintain security of the backup copies.

Also, the backup/restore method as in this invention includes, furthermore, an "integrity judgement process" where it will judge the integrity of the designated backup file when restoring such file during "restore process," and only if the result of "integrity judgement process" prove to be positive (i.e. not infected by a virus or destroyed,) then it will restore the designated file using the backup file, thereby can prevent a situation where a file infected by a virus or corrupted (destroyed) is used in the restore process.

Also, the backup/restore method as in this invention includes, furthermore, a "de-compression/decryption process" to de-compress and/or decrypt the file(s) if the file(s) is/are compressed and/or encrypted, when restoring the file(s) designated by the "restore process," thereby can compress or encrypt the backup files.

Also, the backup/restore method as in this invention will, furthermore, when the "restore detail instructing process" call the "restore process," allow the user to select whether to replace the file (if a same filename exists in the designated directory) or create a new file (under a different directory or change the filename), and when the user select to replace the file during the "restore detail instructing process", the "restore control process" will control the execution of "restore process," use the appropriate backup copy and replace the designated file on first storage device, or when the user select to create a new file, the "restore control process" will control the execution of "restore process," use appropriate backup copy and create a new independent file on the first storage device, thereby allow the users to execute the restore procedure to their preference.

Also, the backup/restore method as in this invention will, furthermore, have the "full backup generation control process" or "backup generation control process" watch the access of the first storage device, and when the first storage device is not accessed, it will control the execution of the "backup copy generating process," and make a backup copy to the second storage device, thereby even if the first storage device is managed by a different device controlled by a multi-tasking OS, it will not obstruct the access of the OS to first storage device, and automatically generate backup copy files.

Also, the backup/restore control apparatus as in this invention will, furthermore, include (1) a "restore detail instructing means" where the user can select the target file (for restoration) and the time in the past backing from the current time to execute the restore process of restore means, so that the files can be restored to a random time in the past, and (2) a "restore control means" wherein, when the execution of "restore process" is called by the "restore detail instructing means," select the corresponding backup file according to the designated file and time period, control the "restore means" and restore the file selected for restoration, thereby, using the backup files it can restore the original files to a state in the past backing from the current time.

Also, according to the backup/restore method as in this invention, furthermore, includes a "full backup generation control procedure" where it will generate a backup of all the files in the first storage device to the second storage device, by controlling the "backup copy generating procedure" according to the pre-set condition and/or the user's selection, enables the backup not only by files but the whole storage device, thereby is useful for restoring the whole storage device.

Also, according to the backup/restore control apparatus as in this invention, furthermore, includes (1) a "backup file selecting means" to pre-select the files to generate backup of, and (2) a "backup generation control means" that generates backup files at pre-set timing by controlling the execution of "backup copy generating means" every time the files as selected by "backup file selecting means" are created or modified, thereby, it can generate backup copies on a file by file basis for those files stored in the first storage device, so it can generate only the files that users want to make backups of. Therefore, it is possible to backup only the files that are more important, and not backup the files that are less important.

The backup/restore control apparatus as in this invention includes, (1) a "backup copy generating means" where a random file stored in the first storage device under control of the host processor unit is copied to a second storage device to make a backup copy, and (2) a "restore means" where such backup copy generated by the "backup copy generating means" is used to restore (an) existing file(s) or (a) non-existing (i.e., already deleted) file(s) in the first storage device, and (3) a "restore detail instructing means" where such file (file name) and time period is designated to execute the "restore process" of the "restore means" to restore those files to a state of designated time period backing from the current time, and (4) a "restore control means" where, in case a "restore process" is executed during the "restore detail instructing means," one file that meets the designated "file name" and "time period" criteria is selected and control the execution of the "restore means," thereby, using the backup files it can restore the original files to a state in the past backing from the current time.

Also, backup/restore control apparatus in this invention includes, furthermore, a "full backup generation control means" where backup copies of all the files in the first storage device are made to the second storage device under pre-set condition and/or as designated by the user to control the "backup copy generating means" while watching the host processor unit access to the first storage device, and sense that the host processor unit is not accessing the first storage device, enables the backup not only by files but the whole storage device, thereby is useful for restoring the whole storage device. Also, as it generates backup copy file(s) while the host processor unit is not accessing the first storage device, even when the host processor unit is controlled by a multi-tasking OS, it will not obstruct the access of multi-tasking OS to the first storage device, and automatically generate backup copy file(s).

Also, according to the backup/restore control apparatus as in this invention, furthermore, includes (1) a "backup file selecting means" to pre-select the files to generate backup of, and (2) a "backup generation control means" that generates backup files at pre-set timing by controlling the execution of "backup copy generating means" every time the files as selected by "backup file selecting means" are created or modified, it can generate backup copies on a file by file basis for those files stored in the first storage device by having the "backup generation control means" watch the host processor unit access to the first storage device, and if it senses that the host processor unit is not accessing the first storage device, it controls the "backup copy generating means" to generate the backup copy, thereby it can generate only the files that users want to make backups of. Therefore, it is possible to backup only the files that are more important, and not backup the files that are less important. Furthermore, as it generates backup copy file(s) while the host processor unit is not accessing the first storage device, even when the host processor unit is controlled by a multi-tasking OS, it will not obstruct the access of multi-tasking OS to the first storage device, and automatically generate backup copy file(s).

Also, according to the backup/restore control apparatus as in this invention, furthermore, it can use the information that was used to restore the pre-selected original files to a state of the past backing from the current time, thereby can identify the restorable state easily and increase the convenience of the restoring process, by including an "elapsed time setting means" where at least one elapsed time (time elapsed since the last modification time) be set for each file as selected by the "backup file selecting means," and an "elapsed time judgement means" where it will compare the current time and the last modification time for files as selected by "backup file selecting means" and judge whether it has exceeded each of the elapsed time as set on the "elapse time setting means" for that particular file, and a "status recording process" where if, during the "elapsed time judgement means" a file has been judged that the elapsed time exceeded the pre-set time, it will record the status of the file (that this file has already exceeded the pre-set time) using the backup copy of that file, and then the "restore detail instructing means" will, from the files that are known to have exceeded the elapsed time as a result of the "status recording means," select the file(s) to restore and designate the elapsed time parameter, and then execute the "restore means," wherein, the "restore control means" will select the copy of the backup file matching that elapsed time as designated by the "restore detail instructing means," control the "restore means" and restore the designated file.

Also, the backup/restore control apparatus as in this invention includes, furthermore, an "integrity judgement means" where it will judge the integrity of the designated file when making a backup copy of such file during the "backup copy generating means," and only if the result of the "integrity judgement means" prove to be positive (i.e. not infected by a virus or destroyed,) then it will generate a backup copy of the designated file, thereby can prevent a situation where the backup copies cannot be used due to infection by a virus or being corrupted (destroyed).

Also, the backup/restore control apparatus as in this invention includes, furthermore, a "compression/encryption means" to compress and/or encrypt the file(s) being generated, when making backup copy(ies) of the files designated by the "backup copy generation means," thereby can make effective usage of the storage medium as well as maintain security of the backup copies.

Also, the backup/restore control apparatus as in this invention includes, furthermore, an "integrity judgement means" where it will judge the integrity of the designated backup file when restoring such file during the "restore means," and only if the result of "integrity judgement means" prove to be positive (i.e. not infected by a virus or destroyed,) then it will restore the designated file using the backup file, thereby can prevent a situation where a file infected by a virus or corrupted (destroyed) is used in the restore process.

Also, the backup/restore control apparatus as in this invention includes, furthermore, a "de-compression/decryption means" to de-compress and/or decrypt the file(s) if the file(s) is/are compressed and/or encrypted, when restoring the file(s) designated by the "restore means," thereby can compress or encrypt the backup files.

Also, the backup/restore control apparatus as in this invention will, furthermore, when the "restore detail instructing means" call the "restore process" of "restore means," allow the user to select whether to replace the file (if a same filename exists in the designated directory) or create a new file (under a different directory or change the filename), and when the user select to replace the file during the "restore detail instructing means", the "restore control means" will control the execution of "restore means," use the appropriate backup copy and replace the designated file on first storage device, or when the user select to create a new file, the "restore control means" will control the execution of "restore means," use appropriate backup copy and create a new independent file on the first storage device, thereby allow the users to execute the restore procedure to their preference.

Also, the computer-readable recording medium storing the backup/restore program as descried in invention includes, furthermore, (1) a "restore detail instructing procedure" where the user can select the target file (for restoration) and the time in the past backing from the current time to execute the restore procedure, so that the files can be restored to a random time in the past, and (2) a "restore control procedure" wherein, when the execution of "restore procedure" is called by the "restore detail instructing procedure," select the corresponding backup file according to the designated file and time period, control the "restore procedure" and restore the file selected for restoration, thereby, using the backup files it can restore the original files to a state in the past backing from the current time.

Also, the computer-readable recording medium storing the backup/restore program as descried in this invention includes, furthermore, a "full backup generation control procedure" where it will generate a backup of all the files in the first storage device to the second storage device, by controlling the "backup copy generating procedure" according to the pre-set condition and/or the user's selection, enables the backup not only by files but the whole storage device, thereby is useful for restoring the whole storage device.

Also, the computer-readable recording medium storing the backup/restore program as descried in this invention includes, furthermore, a "backup file recording procedure" to record the file(s) when the target file(s) is/are designated, and a "backup generation control procedure" to control the execution of above-mentioned "backup generation procedure" so as to generate a backup copy at pre-set timing every time the designated file(s) selected during the above-mentioned "backup file selecting procedure" is/are created or updated, thereby, it can generate backup copies on a file by file basis for those files stored in the first storage device, so it can generate only the files that users want to make backups of. Therefore, it is possible to backup only the files that are more important, and not backup the files that are less important.

Also, according to the computer-readable recording medium storing the backup/restore program as descried in this invention, furthermore, it can use the information that was used to restore the pre-selected original files to a state of the past backing from the current time, thereby can identify the restorable state easily and increase the convenience of the restoring process, by including an "elapsed time recording procedure" where at least one elapsed time (time elapsed since the last modification time) be recorded for each file as recorded by "backup file recording procedure," and an "elapsed time judgement procedure" where it will compare the current time and the last modification time for files as recorded by "backup file recording procedure" and judge whether it has exceeded each of the elapsed time as recorded on "elapse time recording procedure" for that particular file, and a "status recording procedure" where if, during the "elapsed time judgement procedure" a file has been judged that the elapsed time exceeded the pre-set time, it will record the status of the file (that this file has already exceeded the pre-set time) using the backup copy of that file, and then the "restore detail instructing procedure" will, from the files that are known to have exceeded the elapsed time as a result of the "status recording procedure," accept the selection of file(s) to restore, accept the elapsed time parameter for each file, and accept the execution of restore procedure, then, the "restore control procedure" will select the copy of the backup file(s) out of the file(s) matching the elapsed time as designated by the "restore detail instructing procedure," control the "restore procedure" and restore the designated file.

Also, the computer-readable recording medium storing the backup/restore program as descried in this invention includes, furthermore, an "integrity judgement procedure" where it will judge the integrity of the designated file when making a backup copy of such file during the "backup copy generating procedure," and only if the result of the "integrity judgement procedure" prove to be positive (i.e. not infected by a virus or destroyed,) then it will generate a backup copy of the designated file, thereby can prevent a situation where the backup copies cannot be used due to infection by a virus or being corrupted (destroyed).

Also, the computer-readable recording medium storing the backup/restore program as descried in this invention includes, furthermore, a "compression/encryption procedure" to compress and/or encrypt the file(s) being generated, when making backup copy(ies) of the files designated by the "backup copy generation procedure," thereby can make effective usage of the storage medium as well as maintain security of the backup copies.

Also, the computer-readable recording medium storing the backup/restore program as descried in this invention includes, furthermore, an "integrity judgement procedure" where it will judge the integrity of the designated backup file when restoring such file during the "restore procedure," and only if the result of "integrity judgement means" prove to be positive (i.e. not infected by a virus or destroyed,) then it will restore the designated file using the backup file, thereby can prevent a situation where a file infected by a virus or corrupted (destroyed) is used in the restore process.

Also, the computer-readable recording medium storing the backup/restore program as descried in this invention includes, furthermore, a "de-compression/decryption procedure" to de-compress and/or decrypt the file(s) if the file(s) is/are compressed and/or encrypted, when restoring the file(s) designated by the "restore procedure," thereby can compress or encrypt the backup files.

Also, the computer-readable recording medium storing the backup/restore program as descried in this invention includes, furthermore, when the "restore detail instructing procedure" call the "restore procedure," allow the user to select whether to replace the file (if a same filename exists in the designated directory) or create a new file (under a different directory or change the filename), and when the user select to replace the file during the "restore detail instructing procedure", the "restore control procedure" will control the execution of "restore procedure," use the appropriate backup copy and replace the designated file on first storage device, or when the user select to create a new file, the "restore control procedure" will control the execution of "restore procedure," use appropriate backup copy and create a new independent file on the first storage device, thereby allow the users to execute the restore procedure to their preference.

Also, the computer-readable recording medium storing the backup/restore program as descried in this invention will, furthermore, have the "full backup generation control procedure" or "backup generation control procedure" watch the access of the first storage device, and when the first storage device is not accessed, it will control the execution of the "backup copy generating procedure," and make a backup copy to the second storage device, thereby even if the first storage device is managed by a different device controlled by a multi-tasking OS, it will not obstruct the access of the OS to first storage device, and automatically generate backup copy files.

Also, the computer-readable recording medium storing the backup/restore program as descried in this invention is, a program that is embedded into, as part of, the operating system, that includes such program(s) implementing the "restore detail instructing procedure," "restore control procedure," "full backup generation control procedure,"

"backup file recording procedure," "elapsed time recording procedure," "backup copy generating procedure," "elapsed time judgement procedure," "status recording procedure," "integrity judgement procedure," "compression/encryption procedure," or "de-compression/decryption procedure," thereby can offer the backup/restore program in various composition.

Also, the computer-readable recording medium storing the backup/restore program as descried in this invention is, a program that is embedded into, as part of, the driver of the operating system, that includes such program(s) implementing the "restore detail instructing procedure," "restore control procedure," "full backup generation control procedure," "backup file recording procedure," "elapsed time recording procedure," "backup copy generating procedure," "elapsed time judgement procedure," "status recording procedure," "integrity judgement procedure," "compression/encryption procedure," or "de-compression/decryption procedure," thereby can offer the backup/restore program in various composition.

Furthermore, the computer-readable recording medium storing the backup/restore program as descried in this invention is, a program that is embedded into, as part of, the BIOS, that includes such program(s) implementing the "restore detail instructing procedure," "restore control procedure," "full backup generation control procedure," "backup file recording procedure," "elapsed time recording procedure," "backup copy generating procedure," "elapsed time judgement procedure," "status recording procedure," "integrity judgement procedure," "compression/encryption procedure," or "de-compression/decryption procedure," thereby can offer the backup/restore program in various composition.

APPLICATION POTENTIAL IN THE INDUSTRY

As above, the backup/restore method and its control apparatus, as well as the computer-readable recording medium storing the backup/restore program as in this invention is useful, in a case where the files stored in the computer storage medium are destroyed or deleted and need to be restored, especially when the user wants to restore them to a state of certain time in the past.

What is claimed is:

1. A backup/restore method, the characteristic of which is, to include:
   (1) a "backup copy generating process" where a random file stored in a first storage device is copied to a second storage device to make a backup copy;
   (2) a "restore process" where such backup copy generated by the above-mentioned "backup copy generating process" is used to restore (an) existing file(s) or (a) non-existing (i.e., already deleted) file(s) in the first storage device;
   (3) a "restore detail instructing process" where a target file (file name) and time period is designated to execute the above-mentioned "restore process" to restore those files to a state of designated time period backing from the current time;
   (4) a "restore control process" where, in case a "restore process" is executed during the above-mentioned "restore detail instructing process," one file that meets the target "file name" and "time period" criteria is selected and control the execution of the above-mentioned "restore process;
   (5) a "backup file selecting process" to pre-select the file(s) to generate backup(s) of;
   (6) a "backup generation control process" to control the execution of above-mentioned "backup copy generating process" so as to generate a backup copy at pre-set timing every time (a) designated file(s) selected during the above-mentioned "backup file selecting process" is/are created or updated;
   (7) an "elapsed time setting process" where at least one elapsed time (time elapsed since the last modification time) be set for each designated file as selected by above-mentioned "backup file selecting process;"
   (7) an "elapsed time judgement process" which compares the current time and the last modification time for files as selected by above-mentioned "backup file selecting process" and judge whether a particular file has exceeded the elapsed time as set on above-mentioned "elapse time setting process" for that particular file; and
   (8) a "status recording process" where if, during the above-mentioned "elapsed time judgement process," a file has been judged that the elapsed time exceeded the pre-set time, the status recording process will record the status of the file (that this file has already exceeded the pre-set time) using the backup copy of that file, and then the above-mentioned "restore detail instructing process" will, from the files that are known to have exceeded the elapsed time as a result of above-mentioned "status recording process," select the target file(s) to restore and designate the above-mentioned time period, and then execute the "restore process," wherein, the above-mentioned "restore control process" will select the copy of the backup file matching that elapsed time as designated by the above-mentioned "restore detail instructing process," control the "restore process" and restore the designated file."

2. Furthermore, a backup/restore method as mentioned in claim 1 of this column, the characteristic of which is, to include a "full backup generation control process" where backup copies of all the files in the first storage device are made to the second storage device under pre-set condition and/or as designated by the user to control the execution of above-mentioned "backup copy generating process."

3. Furthermore, a backup/restore method as mentioned in any one of claim 1 of this column, the characteristic of which is, to include an "integrity judgement process" where it will judge the integrity of the designated file when making a backup copy of such file during the "backup copy generating process," and only if the result of above-mentioned "integrity judgement process" prove to be positive (i.e. not infected by a virus or destroyed,) then it will generate a backup copy of the designated file.

4. Furthermore, a backup/restore method as mentioned in any one of claim 1 of this column, the characteristic of which is, to include a "compression/encryption process" to compress and/or encrypt the file(s) being generated, when making backup copy(ies) of the files designated by the above-mentioned "backup copy generation process."

5. Furthermore, a backup/restore method as mentioned in any one of claim 1 of this column, the characteristic of which is, to include an "integrity judgement process" where it will judge the integrity of the designated backup file when restoring such file during the "restore process," and only if the result of above-mentioned "integrity judgement process" prove to be positive (i.e. not infected by a virus or destroyed,) then it will restore the designated file using the above-mentioned backup file.

6. Furthermore, a backup/restore method as mentioned in claim 4 of this column, the characteristic of which is, to include a "de-compression/decryption process" to de-compress and/or decrypt the file(s) if the file(s) is/are compressed and/or encrypted, when restoring the file(s) designated by the above-mentioned "restore process."

7. A backup/restore method as mentioned in any one of claim 1 of this column, the characteristic of which is, that when the above-mentioned "restore detail instructing process" call the above-mentioned "restore process," it allows the user to select whether to replace the file (if a same filename exists in the designated directory) or create a new file (under a different directory or change the filename), and when the user select to replace the file during the above-mentioned "restore detail instructing process", the above-mentioned "restore control process" will control the execution of above-mentioned "restore process," use the appropriate backup copy and replace the designated file on first storage device, or when the user select to create a new file, the above-mentioned "restore control process" will control the execution of above-mentioned "restore process," use appropriate backup copy and create a new independent file on the first storage device.

8. A backup/restore method as mentioned in claim 2 of this column, the characteristic of which is, to have the above-mentioned "full backup generation control process" or "backup generation control process" watch the access of above-mentioned first storage device, and when the first storage device is not accessed, it will control the execution of above-mentioned "backup copy generating process," and make a backup copy to the second storage device.

9. A backup/restore control apparatus, the characteristic of which is, to include:

(1) a "backup file selecting means" to pre-select the file(s) to generate backup(s) of;

(2) a "backup copy generating means" where a random file stored in the first storage device under control of a host processor unit is copied to a second storage device to make a backup copy;

(3) a "restore means" where such backup copy generated by the above-mentioned "backup copy generating means" is used in a "restore process" to restore (an) existing file(s) or (a) non-existing (i.e., already deleted) file(s) in the first storage device;

(4) a "restore detail instructing means" where such file (file name) and time period is designated to execute the "restore process" of the above-mentioned "restore means" to restore those files to a state of designated time period backing from the current time;

(5) a "restore control means" where, in case the "restore process" is executed during the above-mentioned "restore detail instructing means," one file that meets the designated "file name" and "time period" criteria is selected and control the execution of the above-mentioned "restore means;"

(6) an "elapsed time setting means" for executing an "elapsed time setting procedure" during which at least one elapsed time (time elapsed since the last modification time) is set for each file as selected by above-mentioned "backup file selecting means;"

(7) an "elapsed time judgement means" where it will compare the current time and the last modification time for files as selected by above-mentioned "backup file selecting means" and judge whether it has exceeded each of the elapsed time as set on above-mentioned "elapsed time setting procedures" for that particular file; and (8) a "status recording means" where if, during the above-mentioned "elapsed time judgement means," a file has been judged that the elapsed time exceeded the pre-set time, the "status recording means" will record the status of the file (that this file has already exceeded the pre-set time) using the backup copy of that file, and then the above-mentioned "restore detail instructing means" will, from the files that are known to have exceeded the elapsed time as a result of above-mentioned "status recording means," select the file(s) to restore and designate the above-mentioned time period, and then execute the "restore process" of "restore means," then, the above-mentioned "restore control means" will select the copy of the, backup file matching that elapsed time as designated by the above-mentioned "restore detail instructing means," control the "restore process" and restore the designated file.

10. Furthermore, a backup/restore control apparatus as mentioned in claim 9, of this column, the characteristic of which is, to include a "full backup generation control means" where backup copies of all the files in the first storage device are made to the second storage device under pre-set condition and/or as designated by the user to control the above-mentioned "backup copy generating means" while watching the above mentioned host processor unit access to the above mentioned first storage device, and sense that the host processor unit is not accessing the first storage device.

11. Furthermore, a backup/restore control apparatus as mentioned in claim 9 of this column, the characteristic of which is, to include a "backup file selecting means" to pre-select the file(s) to generate backup(s) of, and a "backup generation control means" to control the above-mentioned "backup generation means" so as to generate a backup copy at pre-set timing every time the designated file(s) selected during the above-mentioned "backup file selecting means" are created or updated, and while the above-mentioned "backup generation control means" watch the above-mentioned host processor unit access to the above-mentioned first storage device, and sense that the host processor unit is not accessing the first storage device, control the above-mentioned "backup copy generating means" to generate the backup copy.

12. Furthermore, a backup/restore control apparatus as mentioned in claim 11, the characteristic of which is, to include an "integrity judgement means" where it will judge the integrity of the designated file when making a backup copy of such file during the "backup copy generating means," and only if the result of above-mentioned "integrity judgement means" prove to be positive (i.e. not infected by a virus or destroyed,) then the above-mentioned "backup copy generating means" will generate a backup copy of the designated file.

13. Furthermore, a backup/restore control apparatus as mentioned in claim 11, the characteristic of which is, to include a "compression/encryption means" to compress and/or encrypt the file(s) being generated, when making backup copy(ies) of the files designated by the above-mentioned "backup copy generation means."

14. Furthermore, a backup/restore control apparatus as mentioned in claim 11, the characteristic of which is, to include an "integrity judgement means" where it will judge the integrity of the designated backup file when restoring such file during the "restore means," and only if the result of above-mentioned "integrity judgement means" prove to be positive (i.e. not infected by a virus or destroyed,) then it will restore the designated file using the above-mentioned backup file.

15. Furthermore, a backup/restore control apparatus as mentioned in claim 13 of this column, the characteristic of which is, to include a "de-compression/decryption means" to de-compress and/or decrypt the file(s) if the file(s) is/are compressed and/or encrypted, when restoring the files designated by the above-mentioned "restore means."

16. A backup/restore control apparatus as mentioned in claim 11, the characteristic of which is, that when the above-mentioned "restore detail instructing means" execute the above-mentioned "restore process" of "restore means," allow the user to select whether to replace the file (if a same filename exists in the designated directory) or create a new file (under a different directory or change the filename), and when the user select to replace the file during the above-mentioned "restore detail instructing means", the above-mentioned "restore control procedure" will control the execution of above-mentioned "restore means," use the appropriate backup copy and replace the designated file on first storage device, or when the user select to create a new file, the above-mentioned "restore control means" will control the execution of above-mentioned "restore means," use appropriate backup copy and create a new independent file on the first storage device.

17. A computer-readable recording medium storing the backup/restore program, the characteristic of which, is a program to execute under a computer:
  (1) a "backup copy generating procedure" where a random file stored in the first storage device is copied to a second storage device to make a backup copy;
  (2) a "restore procedure" where such backup copy generated by the above-mentioned "backup copy generating procedure" is used to restore (an) existing file(s) or (a) non-existing (i.e., already deleted) file(s) in the first storage device;
  (3) a "restore detail instructing procedure" where such file (file name) and time period is designated to execute the above-mentioned "restore procedure" to restore those files to a state of designated time period backing from the current time;
  (4) a "restore control procedure" where, in case a "restore procedure" is executed during the above-mentioned "restore detail instructing procedure," one file that meets the designated "file name" and "time period" criteria is selected and control the execution of the above-mentioned "restore procedure;"
  (5) a "backup file selecting procedure" to pre-select the file(s) to generate backup(s) of;
  (6) a "backup generation control procedure" to control the execution of above-mentioned "backup copy generating procedure" so as to generate a backup copy at pre-set timing every time the designated file(s) selected during the above-mentioned "backup file selecting procedure" is/are created or updated;
  (7) an "elapsed time recording procedure" where at least one elapsed time (time elapsed since the last modification time) be recorded for each file as recorded by above-mentioned "backup file selecting procedure;"
  (8) an "elapsed time judgement procedure" where it will compare the current time and the last modification time for files as recorded by above-mentioned "backup file selecting procedure" and judge whether it has exceeded each of the elapsed time as recorded on above-mentioned "elapsed time recording procedure" for that particular file; and
  (9) a "status recording procedure" where if, during the above-mentioned "elapsed time judgement procedure," a file has been judged that the elapsed time exceeded the pre-set time, it will record the status of the file (that this file has already exceeded the pre-set time) using the backup copy of that file, and then the above-mentioned "restore detail instructing procedure" will, from the files that are known to have exceeded the elapsed time as a result of above-mentioned "status recording procedure," accept the selection of file(s) to restore, accept the above-mentioned elapsed time parameter for each file, and accept the execution of "restore procedure," then, the above-mentioned "restore control procedure" will select the copy of the backup file(s) out of the file(s) matching the elapsed time as designated by the above-mentioned "restore detail instructing procedure," control the "restore procedure" and restore the designated file.

18. Furthermore, a computer-readable recording medium storing the backup/restore program as mentioned in claim 11 of this column, the characteristic of which is, to include a "full backup generation control procedure" where backup copies of all the files in the first storage device are made to the second storage device under pre-set condition and/or as designated by the user to control the execution of above-mentioned "backup copy generating procedure."

19. Furthermore, a computer-readable recording medium storing the backup/restore program as mentioned in any one claim 17 of this column, the characteristic of which is, to include an "integrity judgement procedure" where it will judge the integrity of the designated file when making a backup copy of such file during the "backup copy generating procedure," and only if the result of above-mentioned "integrity judgement procedure" prove to be positive (i.e. not infected by a virus or destroyed,) then the above-mentioned "backup copy generating procedure" will generate a backup copy of the designated file.

20. Furthermore, a computer-readable recording medium storing the backup/restore program as mentioned in any one claim 17 of this column, the characteristic of which is, to include a "compression/encryption procedure" to compress and/or encrypt the file(s) being generated, when making backup copy(ies) of the files designated by the above-mentioned "backup copy generation procedure."

21. Furthermore, a computer-readable recording medium storing the backup/restore program as mentioned in any one of claim 17 of this column, the characteristic of which is, to include an "integrity judgement procedure" where it will judge the integrity of the designated backup file when restoring such file during the "restore procedure," and only if the result of above-mentioned "integrity judgement procedure" prove to be positive (i.e. not infected by a virus or destroyed,) then the above-mentioned "restore procedure" will restore the designated file using the above-mentioned backup file.

22. Furthermore, a computer-readable recording medium storing the backup/restore program as mentioned in claim 16 of this column, the characteristic of which is, to include a "de-compression/decryption procedure" to de-compress and/or decrypt the file(s) if the file(s) is/are compressed and/or encrypted, when restoring the file(s) designated by the above-mentioned "restore procedure."

23. A computer-readable recording medium as mentioned in claim 17 of this column, the characteristic of which is, that when the above-mentioned "restore detail instructing procedure" execute the above-mentioned "restore procedure," allow the user to select whether to replace the file (if a same filename exists in the designated directory) or create a new file (under a different directory or change the filename-), and when the, user select to replace the file during the above-mentioned "restore detail instructing procedure", the above-mentioned "restore control procedure" will control the execution of above-mentioned "restore procedure," use the appropriate backup copy and replace the designated file on first storage device, or when the user select to create a new file, the above-mentioned "restore control means" will control the execution of above-mentioned "restore procedure," use appropriate backup copy and create a new independent file on the first storage device.

24. A computer-readable recording medium as mentioned in claim 18 of this column, the characteristic of which is, to have the above-mentioned "full backup generation control procedure" or "backup generation control procedure" watch the access of above-mentioned first storage device, and when the first storage device is not accessed, it will control the execution of above-mentioned "backup copy generating procedure," and make a backup copy to the second storage device.

25. A computer-readable recording medium as mentioned in claim 17 of this column, the characteristic of which is, a program that is embedded into, as part of, the operating system, that includes such program(s) implementing the above-mentioned "restore detail instructing procedure," "restore control procedure," "full backup generation control procedure," "backup file selecting procedure," "elapsed time recording procedure," "backup copy generating procedure," "elapsed time judgement procedure," "status recording procedure," "integrity judgement procedure," "compression/encryption procedure," or "de-compression/decryption procedure."

26. A computer-readable recording medium as mentioned in claim 17 of this column, the characteristic of which is, a program that is embedded into, as part of, the driver of the operating system, that includes such program(s) implementing the above-mentioned "restore detail instructing procedure," "restore control procedure," "full backup generation control procedure," "backup file selecting procedure," "elapsed time recording procedure," "backup copy generating procedure," "elapsed time judgement procedure," "status recording procedure," "integrity judgement procedure," "compression/encryption procedure," or "de-compression/decryption procedure."

27. A computer-readable recording medium as mentioned in claim 17 of this column, the characteristic of which is, a program that is embedded into, as part of, the BIOS (basic I/O system), that includes such program(s) implementing the above-mentioned "restore detail instructing procedure," "restore control procedure," "full backup generation control procedure," "backup file selecting procedure," "elapsed time recording procedure," "backup copy generating procedure," "elapsed time judgement procedure," "status recording procedure," "integrity judgement procedure," "compression/encryption procedure," or "de-compression/decryption procedure."

* * * * *